(12) United States Patent
Luo

(10) Patent No.: US 6,378,234 B1
(45) Date of Patent: Apr. 30, 2002

(54) SEQUENTIAL STROKE KEYBOARD

(76) Inventor: Ching-Hsing Luo, Department of Electrical Engineering, National Cheng Kung University, Tainan (TW), 70101

( * ) Notice: Subject to any disclaimer, the term of this patent is extended or adjusted under 35 U.S.C. 154(b) by 0 days.

(21) Appl. No.: 09/288,692

(22) Filed: Apr. 9, 1999

(51) Int. Cl.$^7$ ............................................. H03M 11/00
(52) U.S. Cl. ........................... 41/22; 341/26; 708/142; 708/146; 379/368
(58) Field of Search ............................ 341/20, 22, 26, 341/23; 329/68; 708/142, 146

(56) References Cited

U.S. PATENT DOCUMENTS

| | | | | | |
|---|---|---|---|---|---|
| 4,443,789 A | * | 4/1984 | Endfield et al. | ............... | 341/22 |
| 4,490,056 A | * | 12/1984 | Whitaker | ..................... | 400/100 |
| 5,117,455 A | * | 5/1992 | Danish | ......................... | 341/22 |
| 5,258,748 A | * | 11/1993 | Jones | .......................... | 345/172 |
| 5,339,358 A | * | 8/1994 | Danish | ......................... | 79/368 |
| 5,661,476 A | * | 8/1997 | Wang | ........................... | 341/22 |
| 5,982,303 A | * | 11/1999 | Smith | .......................... | 341/22 |
| 6,043,760 A | * | 3/2000 | Laakkonen | .................. | 341/22 |
| 6,043,761 A | * | 3/2000 | Burrell | ........................ | 341/23 |
| 6,130,628 A | * | 10/2000 | Schneider-Hufschmidt | .. | 341/26 |

FOREIGN PATENT DOCUMENTS

GB               2134293       *    7/1983

* cited by examiner

Primary Examiner—Michael Horabik
Assistant Examiner—Albert K. Wong
(74) Attorney, Agent, or Firm—Peter Gibson

(57) ABSTRACT

A keyboard having fewer keys than the characters available utilizes linked sequences of keystrokes in generation of some characters. Other characters may be produced with one keystroke. The difference between linked keystrokes and independent keystrokes both made in sequence is determined by either the length of the interval between keystrokes or use of a delimiting key. A threshold level for the interval between keystrokes which decides whether two sequential keystrokes are linked or not may be set by the user or may be automatically determined with the use of an adaptive predictive algorithm. It is generally suggested that pairs of keys be linked, particularly adjacent pairs of keys in a fixed configuration, and that the characters generated by either a single keystroke of a given key or the characters generated by two linked keystrokes be represented upon the keyboard in a disposition which facilitates intuitive learning of the keyboard. The characters 'A' and 'B' might both be represented between the keys identified as '1' and '2' with the 'A' adjacent the '1' and the 'B' adjacent the '2' connoting that the linked keystrokes 1–2 generate the character 'A', the linked keystrokes 2–1 generate the character 'B' and independent keystrokes 1 and 2 each generate the characters '1' and '2' respectively. The keys may be identified and arranged in a fixed configuration in any manner desired. A hexagonal pattern with keys identified by a simplified Morse code using ·-, -, ··, --, ·-, and -· is specifically suggested for use by those having a physical disability.

61 Claims, 27 Drawing Sheets

SEQUENTIAL STROKE KEYBOARD

BACKGROUND OF THE INVENTION

1. Field of the Invention

The field of the present invention relates generally to keyboards, more particularly to keyboards possessing fewer keys than the number of characters which may be generated by using the keyboard, and most specifically to such keyboards which utilize linked keystrokes to generate characters.

2. General Background

In the present time, often known as the 'information age' information is transmitted by use of both analog and digital means. The pager and cellular phone are two examples of portable communication tools which receive, and transmit as well as receive, respectively, radio signals which may be analog in the case of the cellular phone are strictly digital in the case of the pager though the cellular phone may permit support digital communication as well. More recent and sophisticated portable communication tools associated with 'personal communication systems' (PCS) enable radio facsimile transmission/reception and internet access. Various capabilities are also offered on portable telephones, cellular or otherwise, which are based upon internal memory and the software held in microprocessors. Such capabilities include automatic dialing of telephone numbers and display of the number and name of a current caller.

All these portable communication tools utilizing radio transmission and reception are considered to be characterized by the use of a numeric keypad possessing the digits 0 through 9 and at least two other keys, '*' and '#'. This is based upon a standard telephone keypad which is required for entering a telephone number. Additional dedicated function keys facilitate memory input of such numbers for automatic dialing and may also have dual functions as determined by another dedicated key. A key is typically dedicated to switching the power supply as well.

The input of alphabetic characters, i.e. letters, into memory is also known upon such devices wherein a shifting of mode is first effected by striking either the '*' or '#' key followed by either one, two or three strokes of the same key to obtain 'A', 'B', or 'C' for example with the key labeled '1'. And telephones with memory are known which allow the creation of names by selecting from a sequential tour of the alphabet for each letter desired. If the letter 'n' is desired, for instance, the letters a–m are first waived or z–o is backed through and the 'n' selected. For each letter selected the preceding or succeeding letters of the alphabet must be considered by the device. While many of these devices may have up to twenty different keys the inclusion of the entire alphabet with a key dedicated to each letter of the same is not considered feasible. The basic twelve key numeric keypad mentioned above is necessary and additional function keys are also required. The addition of the twenty-six keys required of the English alphabet to the sixteen or more keys already necessary is believed to be excessively consumptive of space for a hand held device. One cannot use both hands to type on a device which is held in one hand in any case.

Secondly, it is noted that the standard keyboard utilized in association with computers which typically possesses over one hundred keys utilizes a number of function keys each of which, stroked while another type of function key, such as the 'Shift' or 'Alt' or 'Crtl' key is held down, provides several different functions. The 'Shift' key, of course, was first utilized in this manner with manual typewriters to obtain upper case letters and ten other characters: '!', '@', '#', '$', '%', '^', '&', '*', '(',')'; and is still utilized in this manner on the standard one hundred and four key keyboard presently being used to write this document as upper cases for the numbers 1–0 respectively.

It is emphasized that this multiple use of keys requires holding a dedicated function key while another key is stroked. This effectively means that this system cannot be practically utilized upon a hand held device, which is also known herein as a 'palmtop' computer and is inclusive of the communication devices discussed above as well as numerical calculators and other devices using a microprocessor and a keypad for input.

Thirdly, it is considered that many people do not possess full use of both hands and for these people operation of a keyboard requiring simultaneous keystrokes to generate a given character or function is not feasible. Furthermore, standard keyboards with over eighty keys invariably have the keys in close proximity to each other and many people with various physical and neurological disabilities cannot operate these keyboards for this reason.

Fourthly, it is considered well known that the standard QWERTY keyboard requires thorough memorization before one can begin to operate the same with any efficiency, that a great deal of practice is normally required to obtain genuine efficiency after memorization, and that, no matter how practiced an operator of a QWERTY keyboard may be, the fixed configuration of the keys is not well suited to the frequency of the letters typed and the movement of the fingers required. The key dedicated to 'J', for instance is located directly under the index finger of the right hand in correct QWERTY keyboard operation. This key, and the key dedicated to the letter 'K' immediately to the right of the 'J' are the easiest keys for a right handed person to stroke repetitively; but neither key has frequent usage. In fact, the Italian alphabet, based upon the same Roman alphabet from which the twenty-six letter English alphabet is derived, lacks both these letters altogether for the entire language and the only use of these two letters is for adopted foreign words. In other words, the 'J' and 'K' keys are rarely touched by any writer of Italian. This is not to say that QWERTY keyboards are of no use in Italy but that the fixed configuration of keys in the QWERTY layout is considered generally unfortunate with regard to ergonomics in addition to difficulty in memorizing and mastering.

Statement of Need

The above discussion of 'palmtop' computers, which are hand held communication tools possessing both a microprocessor and a keypad or keyboard for input, regardless of other features and capabilities such as radio reception/transmission, firstly indicates that it is considered desirable to have the ability to efficiently input alphabetic characters, i.e. letters, into a device which is too small to permit use of a keyboard possessing individual keys each dedicated to one letter.

Secondly, it is noted that the manner in which multiple characters or functions from a single key is derived with a standard typewriter or computer keyboard, i.e. simultaneous stroking of two different keys, one of which is a dedicated function key, is not feasible upon a hand held device and also that many people lack the use of both hands and cannot effectively operate a keyboard requiring simultaneous keystrokes.

It is thirdly considered that many people, particularly those having a physical or neurological disability which is manifested by poor motor coordination, cannot use a standard QWERTY keyboard either. The spacing between the keys is too close and the number of keys too many to allow use by many people lacking the motor coordination required to effect accurate keystrokes on such a keyboard.

It is fourthly considered that the standard QWERTY keyboard: is difficult to learn; requires considerable practice to master and; is known to possess less than an optimum configuration with regard to frequency of key strokes and the movement of the fingers required in operation.

It is hence considered, for all these reasons, that a poignant need therefore exists for a keyboard which:

(a) is capable of efficiently generating alphabetic characters, i.e. letters, with a fixed configuration of keys which number less than the number of letters in an alphabet;

(b) does not require the simultaneous depression of multiple keys, i.e. simultaneous keystrokes;

(c) can be effectively operated by people who cannot operate a standard keyboard because of the number and proximity of keys upon the same;

(d) does not require the type of memorization necessary to efficiently operate a standard QWERTY keyboard.

SUMMARY OF THE INVENTION

Objects of the Invention

A first principal object of the present invention is the provision for efficient generation of all the characters of an alphabet with operation of a keyboard possessing a lesser number of keys than the number of letters in the alphabet.

A second principal object of the present invention is the provision of a keyboard which does not require simultaneous keystrokes so that the keyboard is both suitable to a hand held device and to an otherwise supported keyboard which may be effectively operated by people lacking the full use of both hands.

A third principal object of the present invention is provision of a keyboard which can be effectively utilized to generate all the characters of an alphabet with operation by a person who is unable to operate a standard keyboard because of the number and proximity of the keys in fixed configuration thereon.

A fourth principal object of the present invention is the provision of a keyboard which can be learned intuitively and which does not require memorization.

Auxiliary objects of the present invention include provision of a keyboard which is ergonomic with regard to key configuration, which does not require extensive practice to master, and which is generally easy to use.

Principles Relating to the Present Invention

All of the objects described above are enabled with appropriate software contained in a communications tool which observes the principles relating to the present invention wherein linkage between sequential pairs of keystrokes generating a given character is established by one of three methods. One method is simply to provide a delimiting key which, stroked after stroking two other keys in sequence, indicates that said two keys are linked and the character associated with that sequentially linked pair of key strokes is desired. This method enables single keystrokes to be recognized as pertaining to another particular character as well but this still requires two keystrokes including stroking of the delimiting key and this method requires three keystrokes at a minimum for the generation of characters associated with linked pairs of keystrokes.

The second method of establishing sequential pairs of keystrokes for generating a given character involves utilization of an interval threshold for the time elapsed between keystrokes. If the time elapsed between any two keystrokes in sequence is less than the threshold interval the two keystrokes are recognized as indicating the generation of a given character. If the time elapsed between any two keystrokes in sequence is more than the threshold interval the first keystroke is recognized as indicating the generation of another given character. Only one or two keystrokes, followed by a slight pause, is required for the generation of a given character following this method. In utilization of this method it is further desirable to provide the capability of setting and changing the length of time employed as the interval threshold.

The third method of establishing sequential pairs of keystrokes for generating a given character also involves utilization of an interval threshold for the time elapsed between keystrokes but the interval threshold is established in response to the typing speed of the operator with utilization of an adaptive predictive algorithm which adjusts the interval threshold utilized to reflect varying typing speeds. The adaptive predictive algorithm essentially begins with a given baseline value for the interval threshold and utilizes a running average, essentially, of keystroke frequency in modifying the interval threshold utilized.

It is suggested that the characters generated by linked pairs of keystrokes be represented upon the keyboard between the two keys and that location of the character represented immediately adjacent one of these two keys indicate that this key is the first of the sequential pair of keys to be stroked in order to generate that character. It is observed that if a rectilinear configuration of keys is utilized possessing rows and columns each key in the configuration possesses the ability to be linked with at least three other vertically, horizontally, or diagonally, adjacent keys and that interiorly located keys may readily possess linkage with eight other keys. Given the ability to use each key independently as well as in a linked pair of keystrokes for the generation of a unique character a simple twelve key keypad of the type found on ordinary telephones yields eighty different characters or functions which is considered sufficient to provide the basic capabilities of either a 'palmtop', i.e. hand held, or 'notebook' computer.

The difference between the two is considered to be mainly one of size as well as capabilities. The 'notebook' computer has a display screen though it may or may not be held in a hand and the 'palmtop' computer might lack a display screen. A 'laptop' computer is not held in a hand and has a display screen large enough to make effective use of full word processing functions while the 'notebook' computer may have a screen and some functions sufficient for basic editing.

If only six keys are utilized in a hexagonal pattern a total of twenty-seven characters are readily obtained with single (6) and repeated (6) keystrokes of the same key combined with (5+4+3+2+1) bi-directional sequentially linked keystrokes in which the order of the two different keys stroked is immaterial. This is sufficient for generation of all the letters of the English alphabet. If unidirectional sequentially linked keystrokes are utilized in which the order in which two different keys are stroked is determinative of the character generated 42 unique characters are available: (6)+(6)+6(5)=42. This configuration is suggested particularly for a communication device enabling people who cannot operate a standard QWERTY keyboard by reason of the number and proximity of the keys as the six keys in a hexagonal pattern may be spaced generously apart from one another.

It is also considered important to fulfillment of the principles relating to the present invention that simultaneous keystrokes be avoided, otherwise operation upon a hand held device is impractical and a keyboard which is otherwise supported may be operated by people who lack the full use of both hands. It is further considered in this regard that more than two sequential keystrokes may be linked in fulfillment of said principles and that a linked sequence of keystrokes may involve only one key. Stroking the same key twice or thrice in quick succession wherein the interval between successive keystrokes is less than the threshold interval followed by an interval exceeding the threshold interval might generate two other characters besides a first character obtained by stroking the key once.

It is preferred, however, that only pairs of linked keystrokes be utilized in order to achieve efficiency. Efficiency is defined, for the purposes of the present invention, as the number of keystrokes required to generate a given character. One, by this definition, represents maximum efficiency and is obtained only by use of keys dedicated to a single character which, for the purposes of the present invention, is not a feasible option. The use of only linked pairs of sequential keystrokes and single keystrokes, both recognized with use of a threshold interval, yields an efficiency of less than two. The use of more than two linked keystrokes would obviously be less efficient and for this reason is not recommended.

Lastly, the capabilities associated with a standard computer keyboard of over eighty keys including the standard QWERTY keyboard with the ten 1–0 numeric keys and secondary upper case symbols, the shift key, control key, alternate key, four cursor keys, the enter key, page up and down keys, insert, home, delete, escape, tab, Caps Lock, back space key, and the multiple function keys typically found on such a keyboard, are considered. Using only single and linked pair keystrokes in accordance with the principles relating to the present invention it is found that only sixteen keys are required to yield all the above characters and functions just mentioned. Over ninety distinct characters and functions are readily generated with such a keyboard and the essential capabilities of a full size keyboard thus made available with a keyboard which may be placed on a hand held device or have the keys spaced apart sufficiently upon an otherwise supported keyboard to enable people who cannot operate a standard keyboard because of the number and proximity of the keys to each other to achieve the capabilities of a standard keyboard.

DETAILED DESCRIPTION OF THE INVENTION

Figure 1:
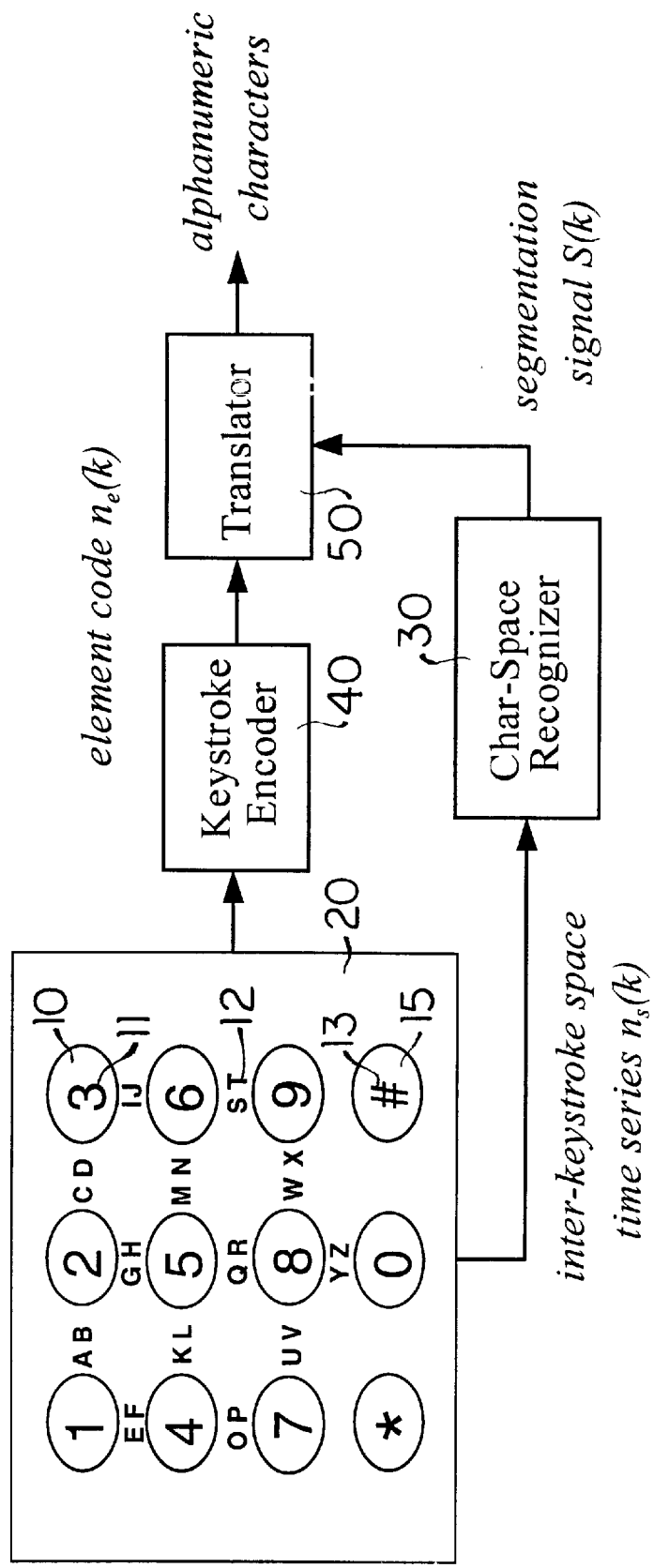
FIG. 1 is a schematic diagram depicting a twelve key keyboard similar to a standard telephone keypad possessing four rows and three columns operating in accordance with the principles relating to the present invention with single and sequentially linked pairs of keystrokes generating the alphanumeric characters depicted thereupon with recognition of an interval threshold for sequential keystroke linkage.

A twelve key alphanumeric keyboard 20 in accordance with the principles relating to the present invention is shown in FIG. 1 that resembles a standard telephone keypad but which enables a user to generate: each alphabetic character with two sequentially linked keystrokes and; each numeric character with only one keystroke. The input of either a single keystroke or a linked pair of keystrokes is effected with a pause following either which is greater than the interval threshold utilized. This pause is recognized by a character-space recognizer, depicted as a Char-Space Recognizer 30 in FIG. 1, which utilizes either a set time value for the interval threshold utilized or a value generated by an adaptive predictive algorithm such as the one depicted in FIG. 24. A Keystroke Encoder 40 identifies the keys 10, 15 stroked for a Translator 50 which combines this identification with the recognition provided by the Char-Space Recognizer 30 to generate the alphanumeric characters 12, 11 represented on the keyboard 20.

To help the users type alphabetic characters 12 intuitively, ten sequentially linkable keys 10 are associated with the 26 alphabetic characters 12 as shown in FIG. 1 wherein each of said alphabetic characters 12 is located between two sequentially linkable keys 10 and indicates that those two sequentially linkable keys 10 may be used in a linked sequence of keystrokes to generate that particular alphabetic character 12. It is further preferred that the alphabetic character 12 immediately adjacent a particular sequentially linkable key 10 identifies the sequentially linkable key 10 which is stroked first in the linked pair of keystrokes generating that alphabetic character 12. Two function keys 15 having '*' and '#' symbols 13 directly thereupon are not utilized for the generation of either numeric characters 11 or alphabetic characters 12 and are reserved for the generation of functions.

By means of illustrative example for the operation of the keyboard 20 depicted in FIG. 1 the alphabetic character 12 'A' is generated by first striking the key 10 with '1' upon it and then the key 10 with '2' upon the same in succession followed by a pause exceeding the threshold interval wherein the time elapsed between these two keystrokes is less than the threshold interval. Similarly, the alphabetic character 12 'B' is generated with the sequentially linked keystrokes 2–1 and the alphabetic character 12 'E' is generated with the sequentially linked keystrokes 1–4 and the alphabetic character 12 'F' is generated with the sequentially linked keystrokes 4–1.

During typing, each keystroke is encoded by the Keystroke Encoder 40 to the element series $n_e(k)$ that is then sent to the Translator 50. At the same time, the intervals between keystrokes are transmitted as interval space time series $n_s(k)$ to the Char-Space Recognizer 30. When an interval exceeds the threshold interval value the interval is recognized as a character-space, i.e. the space for a character, which is opposed to a full, blank, 'space' which is typically used between words, the Recognizer 30 sends a segmentation signal S(k) to the Translator 50. Based on the segmentation signal, the Translator 50 generates a corresponding alphanumeric character 11, 12.

There are two different methods which can be applied to implement the Char-Space Recognizer 30. One is a fixed interval threshold mode of recognition whereby the value of the interval threshold is set at a desired level. This mode of recognition will yield a segmentation signal when an interval between keystrokes exceeds the value given the set interval threshold. It is preferred that the set value of the interval threshold may be changed as desired. The second method traces the typer's speed and automatically changes the value of the threshold interval utilized to adapt to the rate of typing. The Char-Space Recognizer 30 in this case relies upon an adaptive predictive algorithm of the type depicted in FIG. 24. Alternatively, the Char-Space Recognizer 30 may simply rely upon a signal from a single function key 15 such as the one possessing '*' thereupon which was reserved for generating a function.

Figure 2:
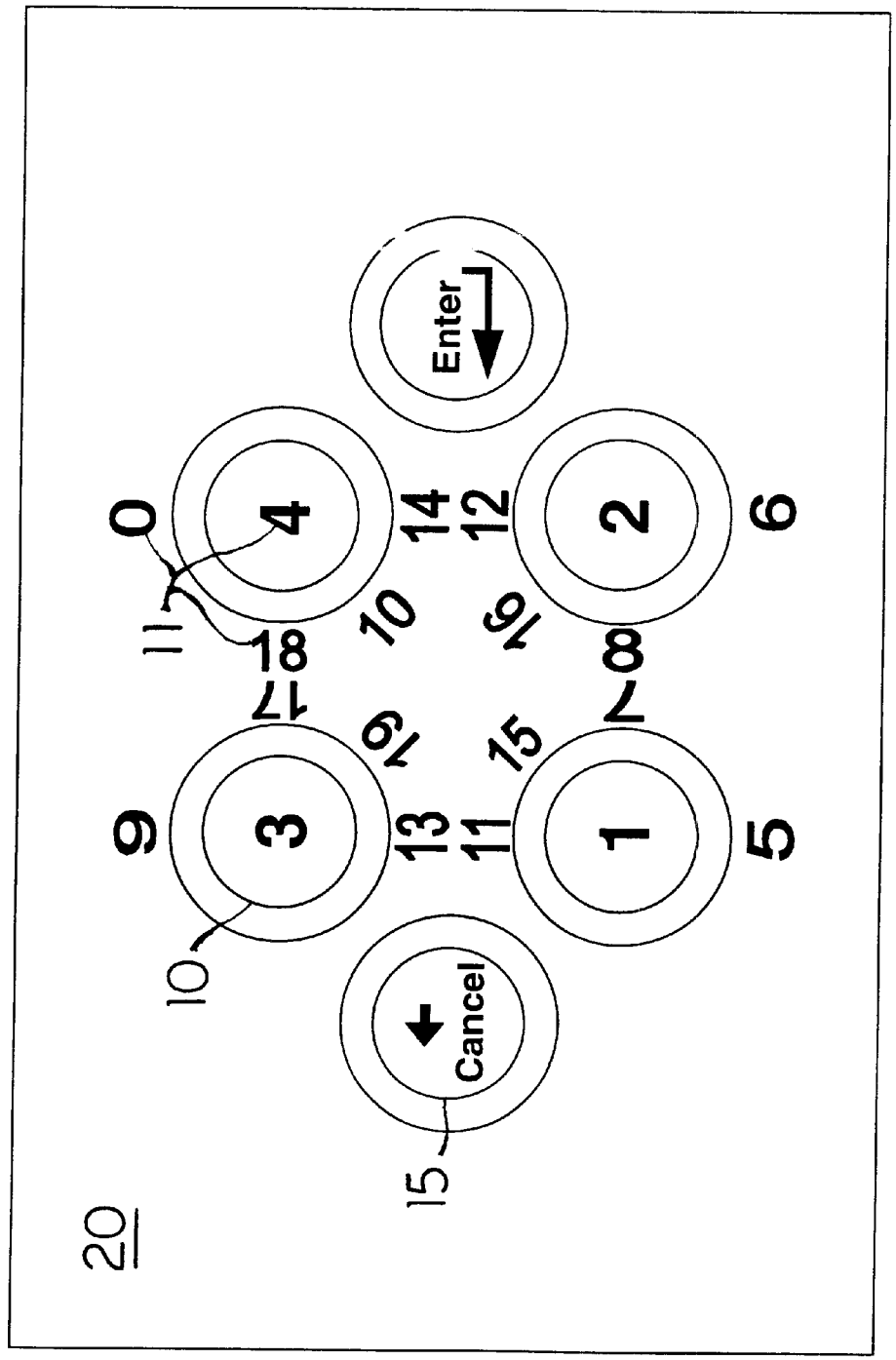
FIG. 2 depicts a fixed hexagonal configuration keyboard in accordance with the principles relating to the present invention which generates the numeric characters 0–19.

FIG. 2 depicts a preferred layout for a keyboard 20 in accordance with the principles relating to the present invention in which six keys 10, 15 are arranged in a hexagon. Four sequentially linkable keys 10 are used for the generation of numeric characters 11 and two function keys 15 labeled 'Cancel' and 'Enter' are also provided. One keystroke is utilized to generate the numeric characters 11 '1', '2', '3', and '4'. The numeric characters 11 shown in pairs between pairs of the four sequentially linkable keys 10 are generated in the manner described above for the alphabetic characters 12 shown between the sequentially linkable keys 10 depicted in FIG. 1. To generate the numeric character 11 '7', for example, the sequentially linkable keys 10 labeled '1' and '2' are stroked in the linked sequence 1–2 and the numeric character 11 '8' is generated with the linked sequence 2–1.

In the particular case depicted in FIG. 2 the alternative mentioned above with regard to the Char-Space Recognizer 30 is applicable; a function key 15, the one labeled 'Enter', is relied upon for indicating completion of sequentially linked keystrokes as well as single keystrokes. However, the Char-Space Recognizer 30 and the Keystroke Encoder 40 are virtually replaced by the function keys 15 labeled 'Enter' and 'Cancel' and only minimal microprocessor supplied memory, i.e. a register, is required for storage of keystrokes in addition to these two function keys 15 in order to produce the alphanumeric characters 11, 12 output by the Translator 50 in this case. The Translator 50 is hence effectively reduced to the memory provided as governed by the 'Enter' and 'Cancel' function keys 15 which, respectively, cause transmission of the content of a register or clear the same.

Figure 3:
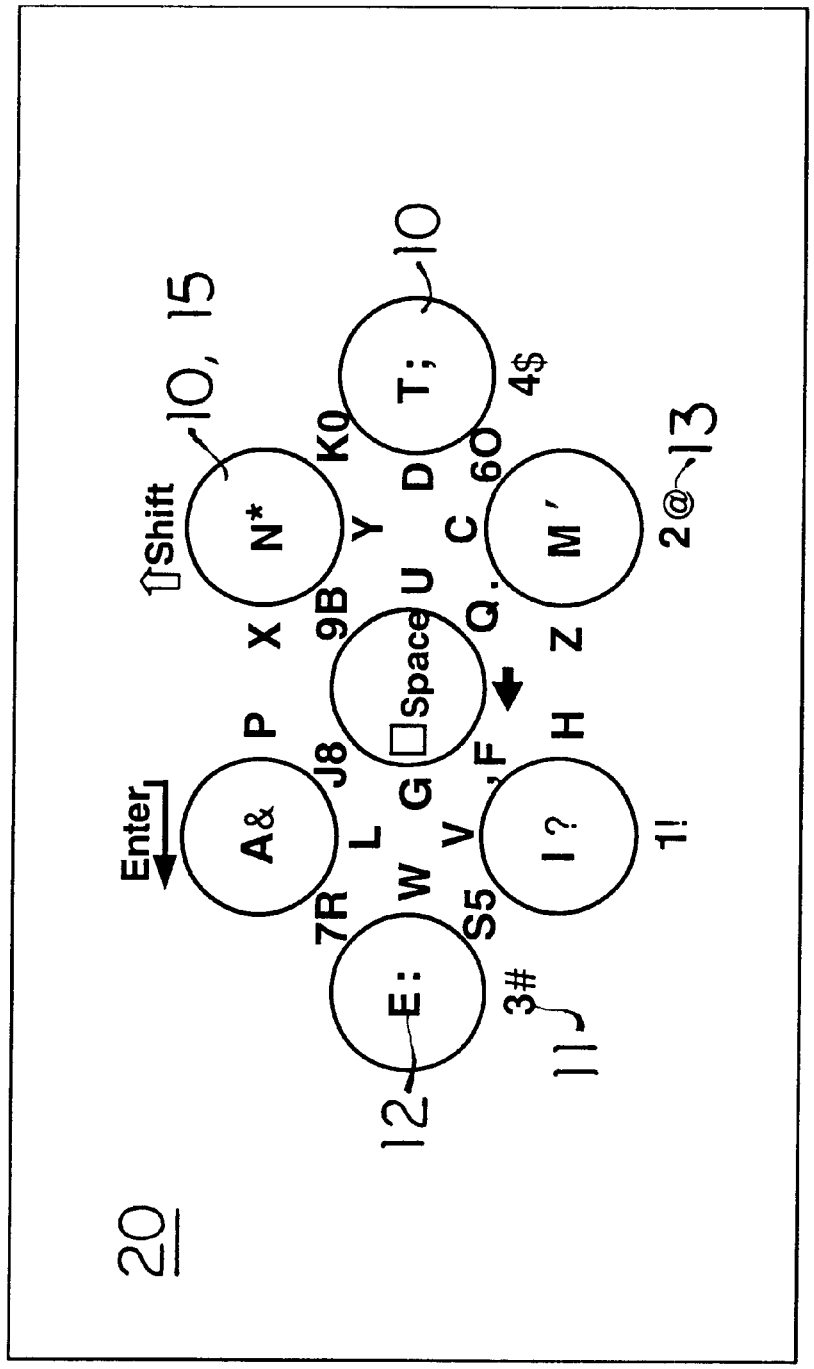
FIG. 3 depicts a seven key fixed configuration keyboard in accordance with the principles relating to the present invention which generates all the letters of the English alphabet along with certain other characters and functions.

A seven key 10, 15 keyboard 20 in accordance with the principles relating to the present invention is depicted in FIG. 3 which is capable of generating alphanumeric characters 12, 11 and is intended to enable the same ergonomically. Six keys 10, 15 in a hexagonal pattern surround a central 'Space' key 10 each labeled with a frequently typed alphabetic character 12 followed by a punctuation symbol 13. A space, as typically effected with a space bar on a full size standard keyboard, and the frequently typed alphabetic characters 12 'A', 'N', 'E', 'T', 'I', and 'M' are each generated with a single keystroke followed by a pause exceeding the threshold interval utilized.

The 'Enter' and 'Shift' functions are generated, as are the numeric characters 11 '1', '2', '3', '4' with a repeated keystroke of the key 10, 15 adjacent to the pertinent label followed by a pause. The alphanumeric characters 12, 11 seen between these keys 10, 15 are generated by sequentially linked pairs of keystrokes in the manner described previously. Each punctuation mark depicted on these keys 10, 15 is generated with use of the shift function whereby the key 10, 15 labeled N* is struck twice followed by a pause and then the key 10, 15 bearing the punctuation symbol 13 desired is struck once followed by a pause. It is also noted that the two keys 10, 15 bearing 'A&' and 'N*' serve, as demonstrated in this case, as both sequentially linkable keys 10 and function keys 15, that the function is obtained by a variation of sequentially linked keystrokes, namely a repeated striking of the same key 10, 15 followed by a pause.

Figure 4:
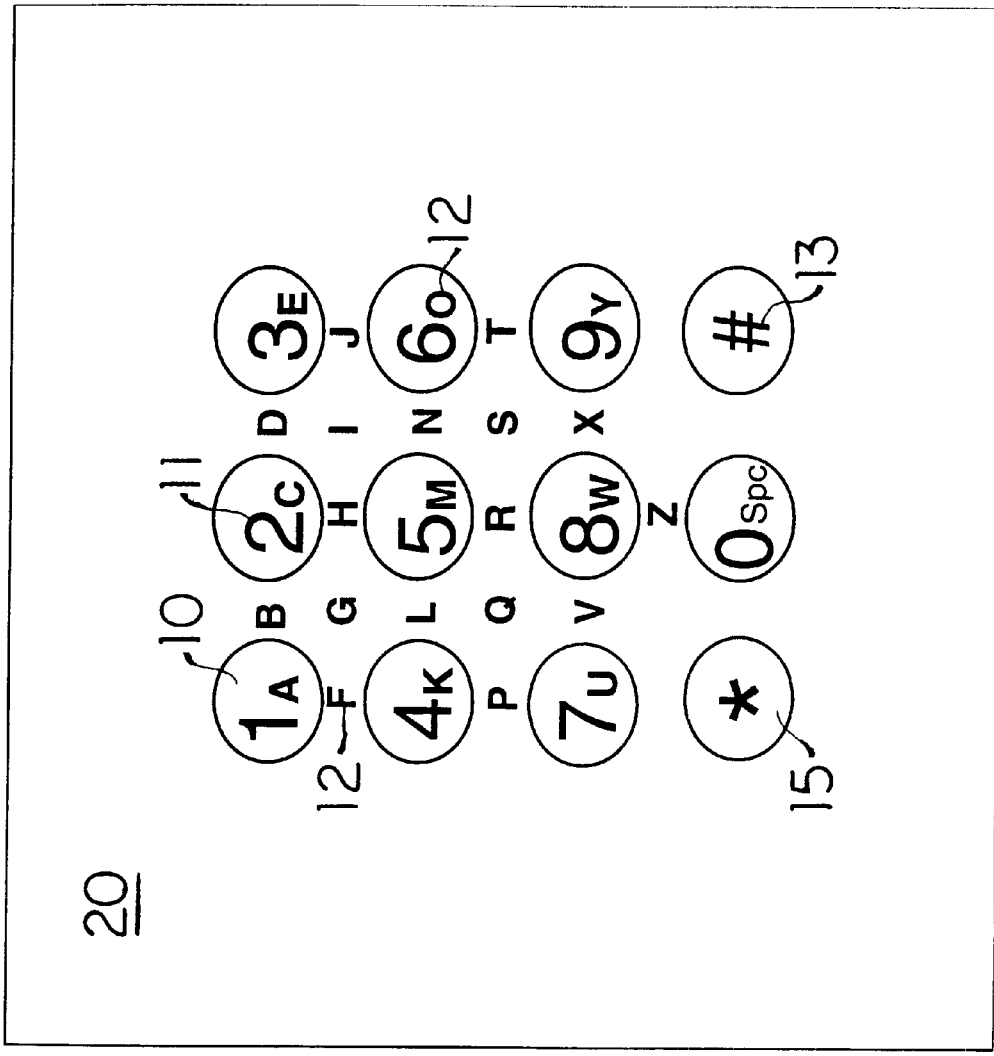
FIG. 4 depicts a twelve key fixed configuration keyboard similar to a standard telephone keypad in accordance with the principles relating to the present invention which generates all the letters of the English alphabet and the numbers 1–0 along with '*' and '#'.

FIG. 4 depicts a keyboard 20 in accordance with the principles relating to the present invention which resembles a standard telephone keypad with twelve keys 10, 15 arranged in three columns and four rows with the numeric characters 11 '1'–'0' arranged in the conventional manner and the alphabetic characters 12 'A'–'Z' arranged alphabetically on and between sequentially linkable keys 10. The two function keys 15 bearing the '*' and '#' symbols 13 are not utilized for sequentially linked keystrokes. One function key 15, that labeled by the '*' symbol 13, for example, is utilized for a mode change between: (a) the generation of numeric characters 11 in one mode effected with single keystrokes requiring neither sequentially linked keystrokes nor the function provided by a Char-Space Recognizer 30 and; (b) the generation of alphabetic characters 12 in the other mode.

The alphabetic characters 12 shown on the sequentially linkable keys 10; 'A', 'C', 'E', 'K', 'M', 'O', 'U', 'W', and 'Y' are generated with single keystrokes in the alphabetic character 12 generation mode. In the same mode the other alphabetic characters 12, each found between a pair of sequentially linkable keys 10, are generated by sequentially linked pairs of keystrokes followed by a pause. Because only one alphabetic character 12 is utilized between each pair of such keys 10 the order in which the pair of keystrokes is made needn't matter. In other words, a 'B' may be generated by the sequentially linked keystrokes 1–2 or 2–1 and the letter 'G' generated by 1–5, 5–1, 2–4, or 4–2. A space is generated with a single keystroke striking the key 10 labeled '0 Spc' while in the alphabetic character 12 generation mode. Furthermore, the lower case alphabetic characters 12 'a', 'c', 'e', 'k', 'm', 'o', 'u', 'w', and 'y' may be generated with single keystrokes and the upper case alphabetic characters 12 'A', 'C', 'E', 'K', 'M', 'O', 'U', 'W', and 'Y' are generated with repeated keystrokes of the same keys 10. The other alphabetic characters 12 depicted between the keys 10 may yield upper and lower cases by reversing the sequence of linked keystrokes. For example, a 'b' may be generated with the sequentially linked keystrokes 1–2 while 'B' may be generated with the sequentially linked keystrokes 2–1 and 'z' generated with the sequentially linked keystrokes 8–0 while 'Z' is generated with the sequentially linked keystrokes 0–8.

Figure 5:
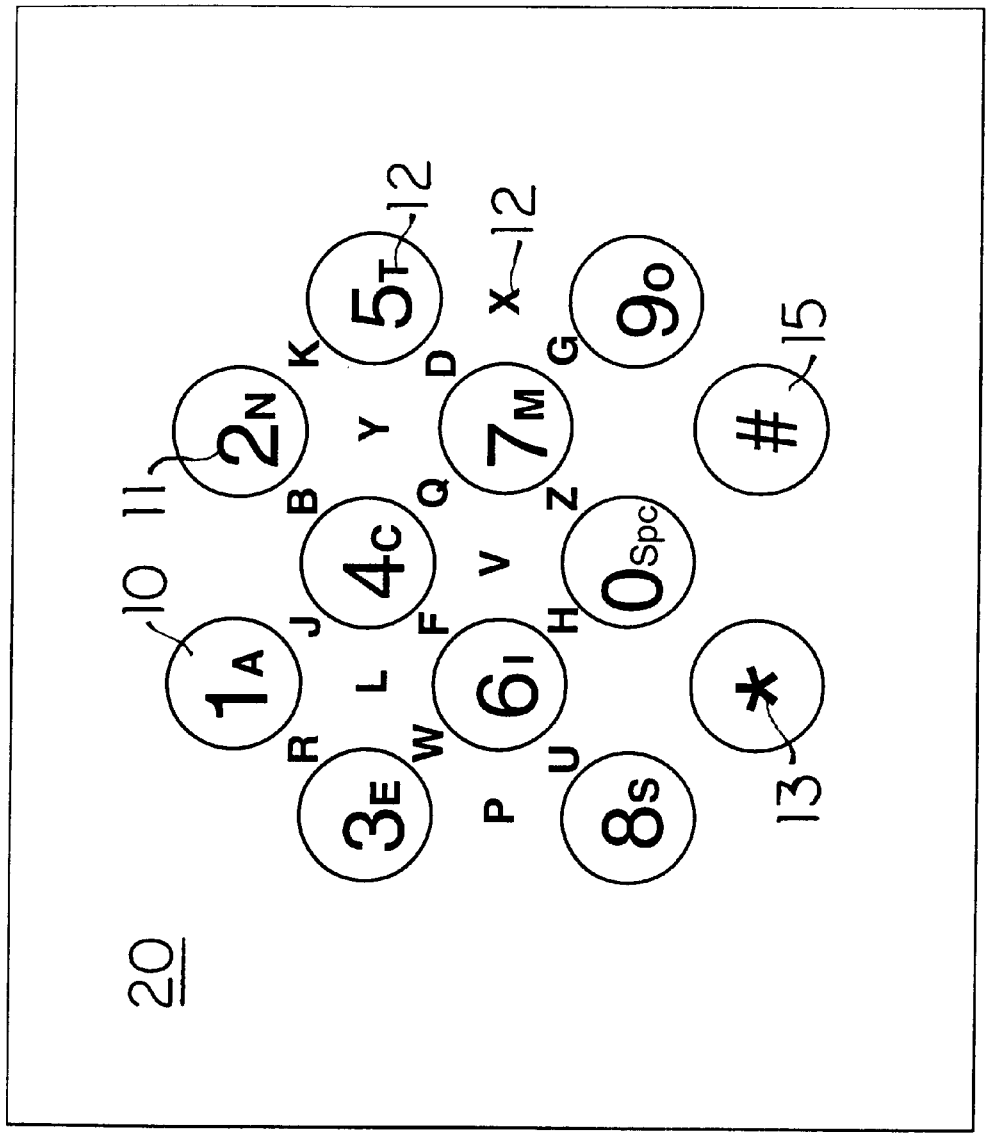
FIG. 5 depicts an alternate diamond pattern twelve key fixed configuration keyboard with offset rows in accordance with the principles relating to the present invention which generates all the letters of the English alphabet and the numbers 1–0 along with '*' and '#'.

A similar embodiment of the principles relating to the present invention is depicted in FIG. 5 wherein twelve keys 10, 15 are arranged in a offset diamond pattern of five rows and operation is essentially the same as that discussed above with reference to FIG. 4 except for two differences. First, it is noted that the alphabetic characters 12 shown on the keys 10 are different; 'A', 'N', 'E', 'C', 'T', 'I', 'M', 'S', and 'O' are generated by a single keystroke because these letters are most frequently typed. This arrangement requires memorization but the optimum typing speed is increased. An average of 1.65 keystrokes is achieved with this arrangement. Secondly, this arrangement is specially suitable for physically impaired persons because the space between two keys 10 in FIG. 5 is greater than utilized in the keyboard 20 depicted in FIG. 4. The alphabetic character 12 'R', for example is generated with the linked keystrokes 1–3 and the alphabetic character 12 'L' with 1–6 only.

Figure 6:
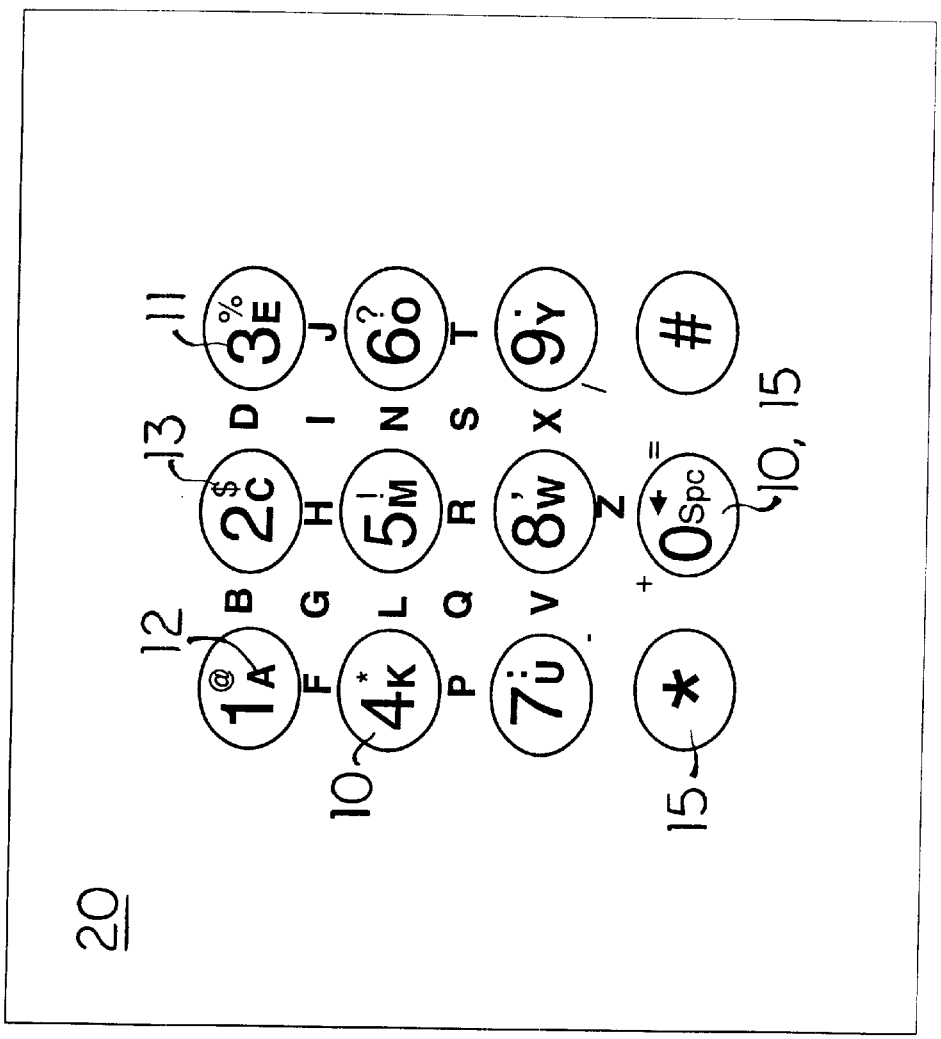
FIG. 6 depicts a twelve key fixed configuration keyboard similar to a standard telephone keypad in accordance with the principles relating to the present invention possessing additional characters.

FIG. 6 shows a keyboard 20 in accordance with the principles relating to the present invention similar to the keyboard 20 represented in FIG. 4 with the alphabetic characters 12 generated in the same manner. Thirteen punctuation symbols 13 have been added, however, which are generated by repeated sequentially linked keystrokes of the sequentially linked keys 10 bearing the numeric characters 11 '1'–'9'. Repeated stroking of the key 10, 15 labeled '0' effects a backstroke which effectively deletes the previous character entry. A single stroke of this same key 10 in the alphabetic character 12 generation mode effects a space. The alphabetic characters 12 are, as in FIG. 4, noted to be arranged alphabetically to facilitate operation without memorization. It is further noted that both upper and lower case alphabetic character 12 generation is not facilitated by the keyboard 20 depicted in FIG. 6.

Figure 7:
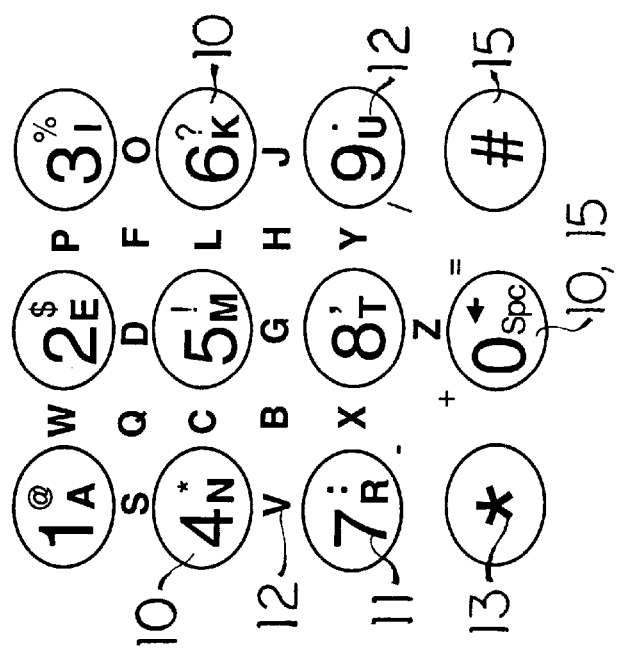
FIG. 7 depicts a twelve key fixed configuration similar to a standard telephone keypad in accordance with the principles relating to the present invention with frequently typed alphabetic characters generated with a single keystroke.

FIG. 7 shows a keyboard 20 in accordance with the principles relating to the present invention similar to the keyboard 20 represented in FIG. 6 with the numeric characters 11, alphabetic characters 12, and punctuation symbols 13 generated in the same manner along with the space and backspace being effected in the same manner. The alphabetic characters 12 are arranged, however, in a manner intended to facilitate an increased efficiency in the number of keystrokes necessary for typing text wherein the most frequently typed alphabetic characters 12 are generated with a single keystroke.

Figure 8:
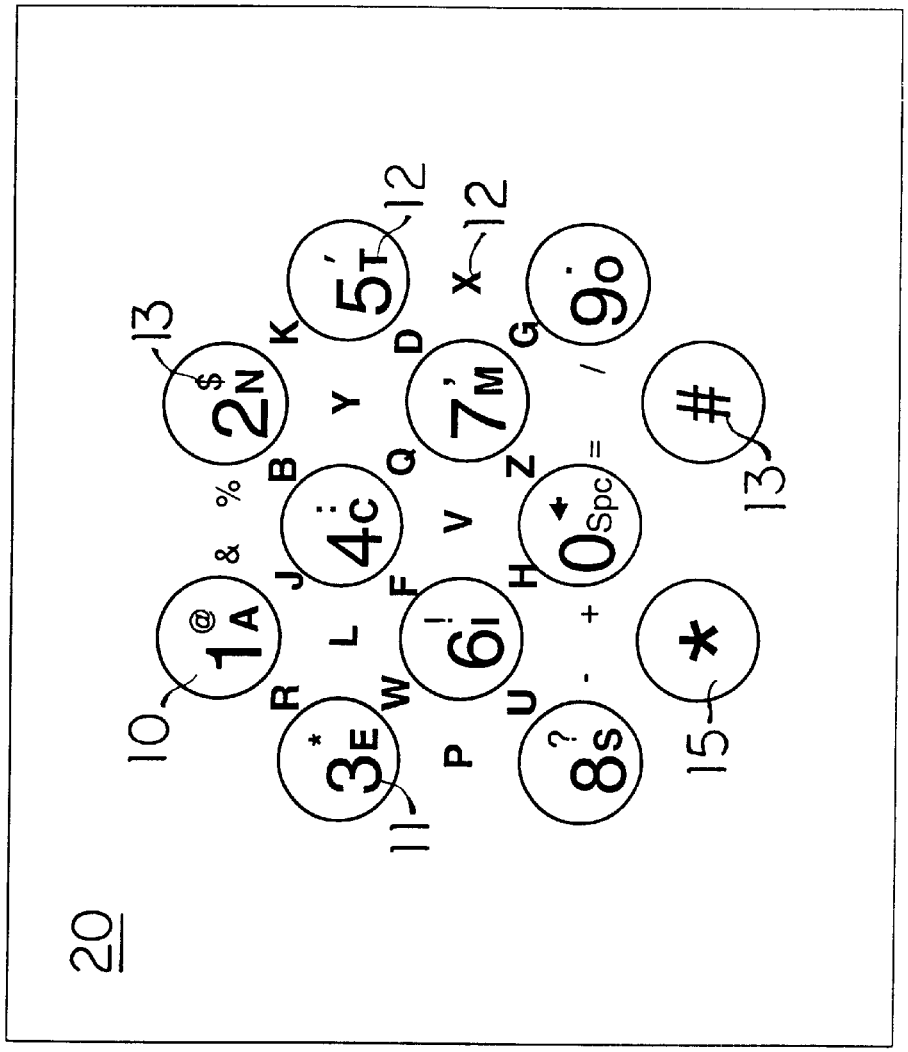
FIG. 8 depicts an alternate diamond pattern twelve key fixed configuration keyboard with offset rows in accordance with the principles relating to the present invention with frequently typed alphabetic characters generated with a single keystroke.

FIG. 8 shows a keyboard 20 in accordance with the principles relating to the present invention similar in configuration to the keyboard 20 represented in FIG. 5 but with the numeric characters 11, alphabetic characters 12, and punctuation symbols 13 along with the space and backspace functions being generated in the same manner as the keyboards 20 discussed immediately above and depicted in FIGS. 6 & 7, further generating the same thirteen punctuation symbols 13 in the same manner.

Figure 9:
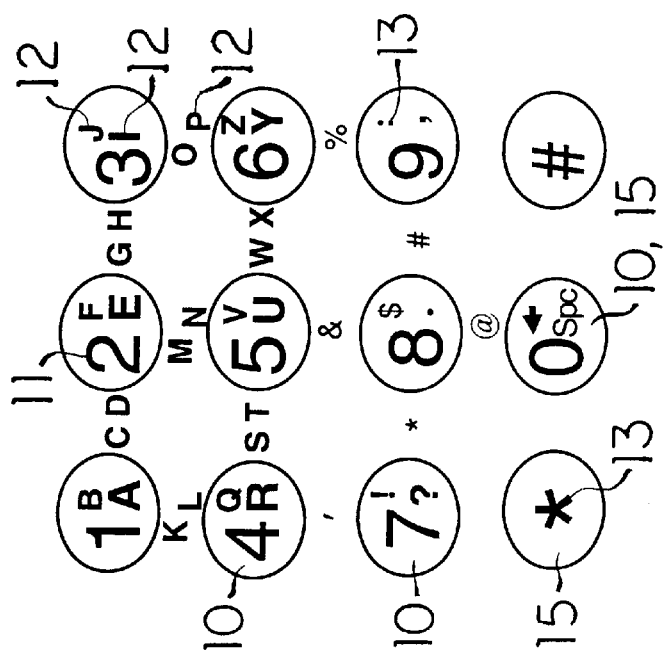
FIG. 9 depicts a twelve key fixed configuration keyboard similar to a standard telephone keypad in accordance with the principles relating to the present invention with alphabetic characters grouped together in an upper zone.

FIG. 9 shows a keyboard 20 in accordance with the principles relating to the present invention similar in configuration to the standard telephone keypad possessing twelve keys 10, 15 in three columns and four rows bearing the conventional numeric characters 11 '1'–'0' and the '*'and '#' symbols 13. The alphabetic characters 12, however, are alphabetically grouped in a zone comprising the upper six keys 10, with the punctuation symbols 13 grouped in a lower zone including the keys 10 bearing the numeric characters 11 '7'–'0'. This arrangement is considered superior in facilitating intuitive learning. Two alphabetic characters 12 are depicted on a single sequentially linkable key 10 and between horizontally and vertically adjacent sequentially linkable keys 10.

The alphabetic character 12 shown as larger and lower on a key 10 in FIG. 9 is generated with a single keystroke, the other alphabetic characters 12 being generated with a repeated striking of the same key 10 and the alphabetic characters 12 between keys 10 are each generated with a sequentially linked pair of keystrokes in the manner described in relation to the keyboards 20 depicted in FIG. 1.

The single punctuation symbols 13 depicted between pairs of horizontally and vertically adjacent keys 10 are generated with sequentially linked pairs of keystrokes without regard for which key 10 is struck first. For the purpose of more clearly distinguishing between these two types of sequentially linked keystrokes the last type mentioned is considered to be a 'bi-directional' sequentially linked keystroke while the other, used to generate alphabetic characters 12 in this case, is considered to be a 'uni-directional' sequentially linked keystroke.

The particular case associated with FIG. 9, moreover, as mentioned above, utilizes only bi-directional sequentially linked keystrokes which are between horizontally or vertically adjacent keys 10 for the generation of punctuation symbols 13. The sequentially linked keystrokes made utilizing these keys 10 may hence be considered, for the purpose of providing clear distinction, to be 'rectilinear' as opposed to 'diagonal' sequentially linked keystrokes made utilizing keys 10, 15 which are diagonally adjacent one another as in the keyboards 20 depicted in FIGS. 4, 6, & 7. The keyboards 20 possessing a 'diamond' configuration with offset rows of keys 10, such as those depicted in FIGS. 3, 5, & 8, are considered to provide sequentially linked keystrokes which are both 'rectilinear' and 'diagonal' with horizontal links between keys 10 in the same row, vertical links between keys 10 in alternate rows, i.e. the same column, and diagonal links between pairs of keys 10 in adjacent rows.

Figure 10:
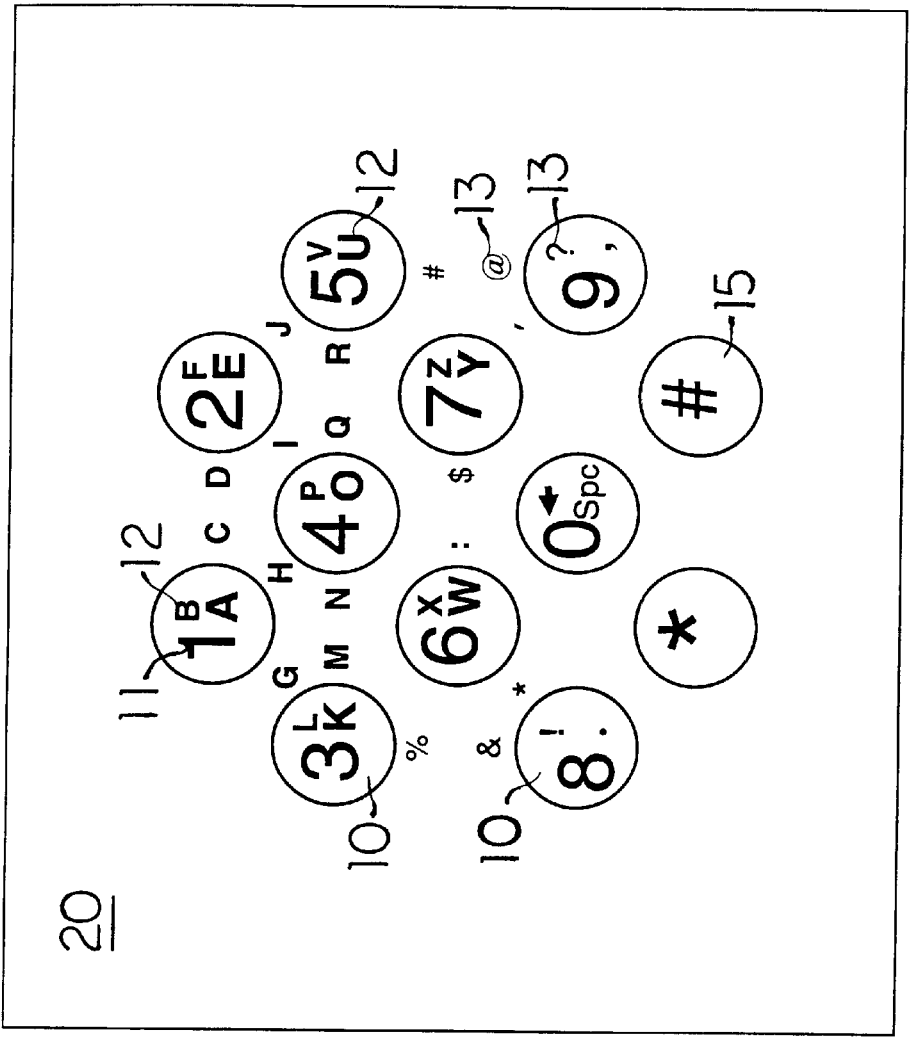
FIG. 10 depicts an alternate diamond pattern twelve key fixed configuration keyboard with offset rows in accordance with the principles relating to the present invention with alphabetic characters grouped together in an upper zone.

FIG. 10 shows a keyboard 20 in accordance with the principles relating to the present invention with keys 10 arranged in a diamond configuration similar the keyboards 20 depicted in FIGS. 4, 6, & 7 but with the numeric characters 11, alphabetic characters 12, and punctuation symbols 13 along with the space and backspace functions being generated in the same manner as the keyboards 20 discussed immediately above and depicted in FIG. 9, except that diagonal as well as rectilinear sequentially linked keystrokes are utilized for the generation of alphabetic characters 12 and the punctuation symbols 13.

Figure 11:
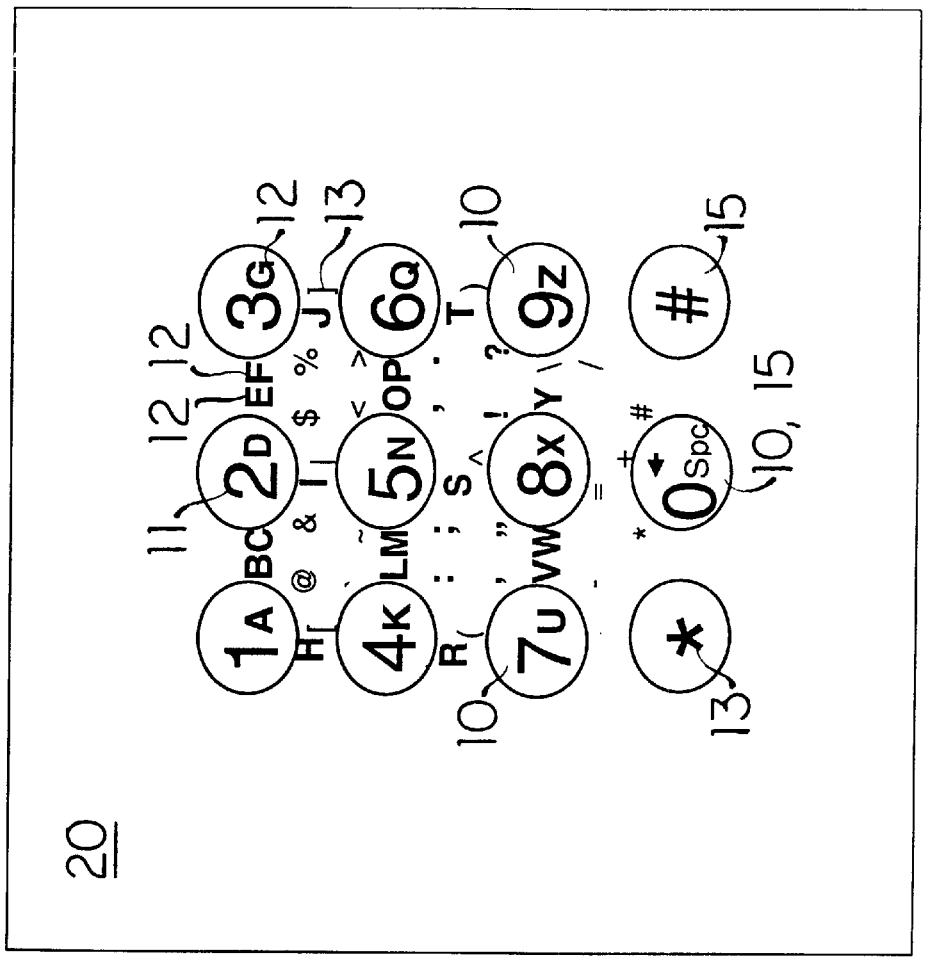
FIG. 11 depicts a twelve key fixed configuration keyboard similar to a standard telephone keypad in accordance with the principles relating to the present invention with 29 additional characters and with alphabetic characters arranged alphabetically.
Figure 12:
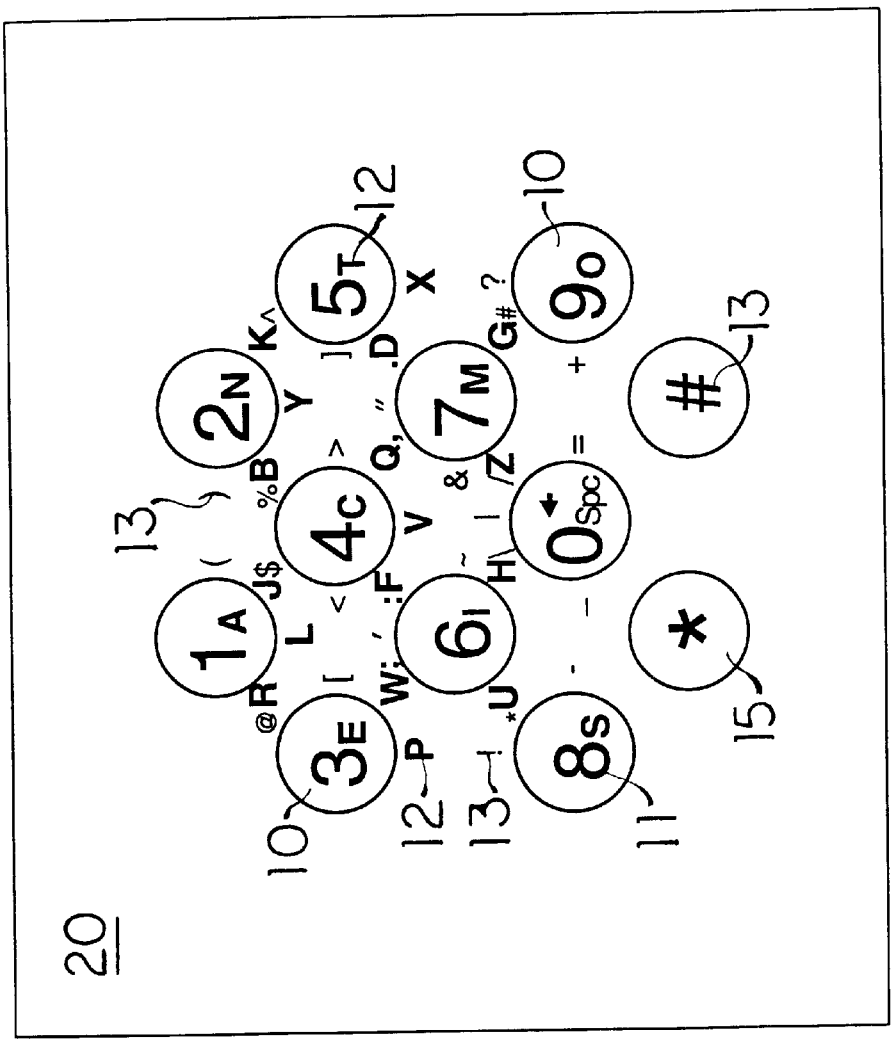
FIG. 12 depicts an alternate diamond pattern twelve key fixed configuration keyboard with offset rows in accordance with the principles relating to the present invention with the additional characters depicted in FIG. 11 and frequently typed alphabetic characters generated with a single keystroke.

FIG. 11 shows a keyboard 20 in accordance with the principles relating to the present invention similar in configuration to the standard telephone keypad possessing twelve keys 10, 15 in three columns and four rows bearing the conventional numeric characters 11 '1'–'0' and the '*' and '#' symbols 13 further possessing 29 additional punctuation symbols 13 as well as a full complement of 26 alphabetic characters 12 arranged alphabetically. Uni-directional rectilinear and diagonal sequentially linked keystrokes are utilized for most of the alphabetic characters 12 and all of the punctuation symbols 13. Single strokes in the numeric mode generate numeric characters 11 and single strokes in the alphabetic mode generate some alphabetic characters 12. Repeated keystrokes are used for generating a backspace only. FIG. 12 shows a keyboard 20 which operates in the same manner except that the arrangement of keys 10, 15 is in a diamond configuration with offset rows and the alphabetic characters 12 most frequently used in typing are generated by one keystroke in the alphabetic mode.

Figure 13:
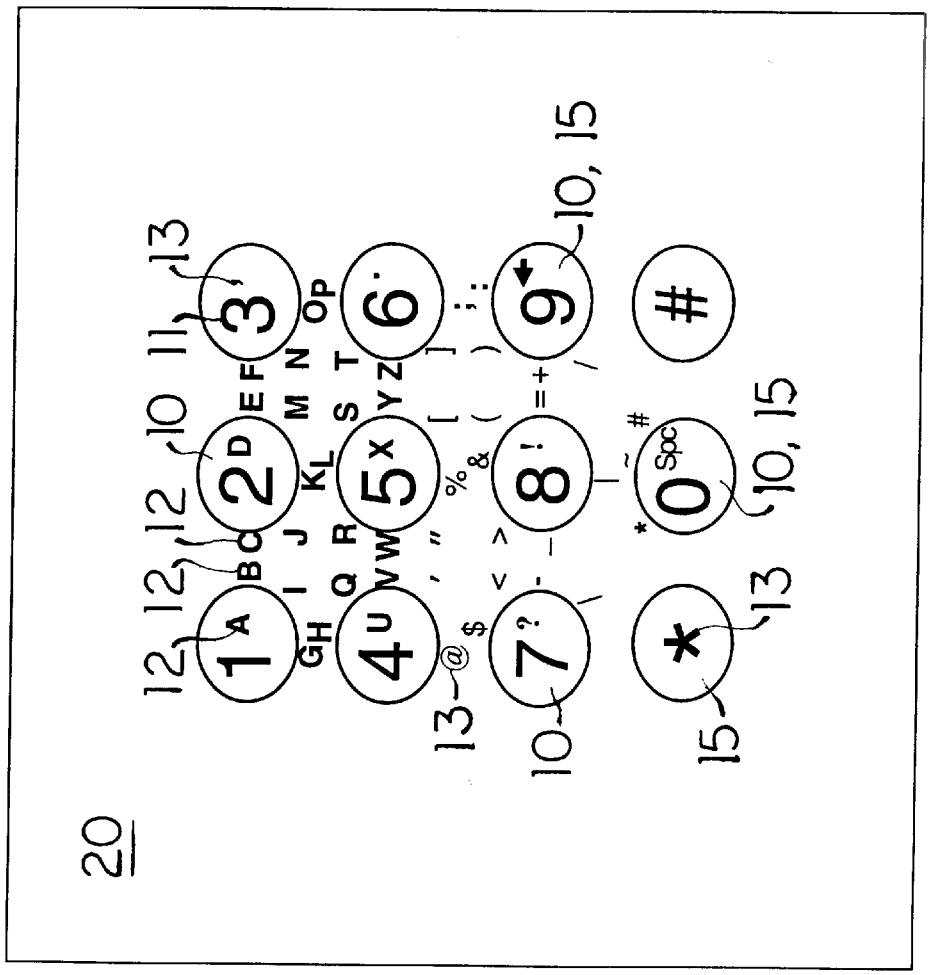
FIG. 13 depicts a twelve key fixed configuration keyboard similar to a standard telephone keypad in accordance with the principles relating to the present invention with 28 additional characters and with alphabetic characters arranged alphabetically and grouped into an upper zone.
Figure 14:
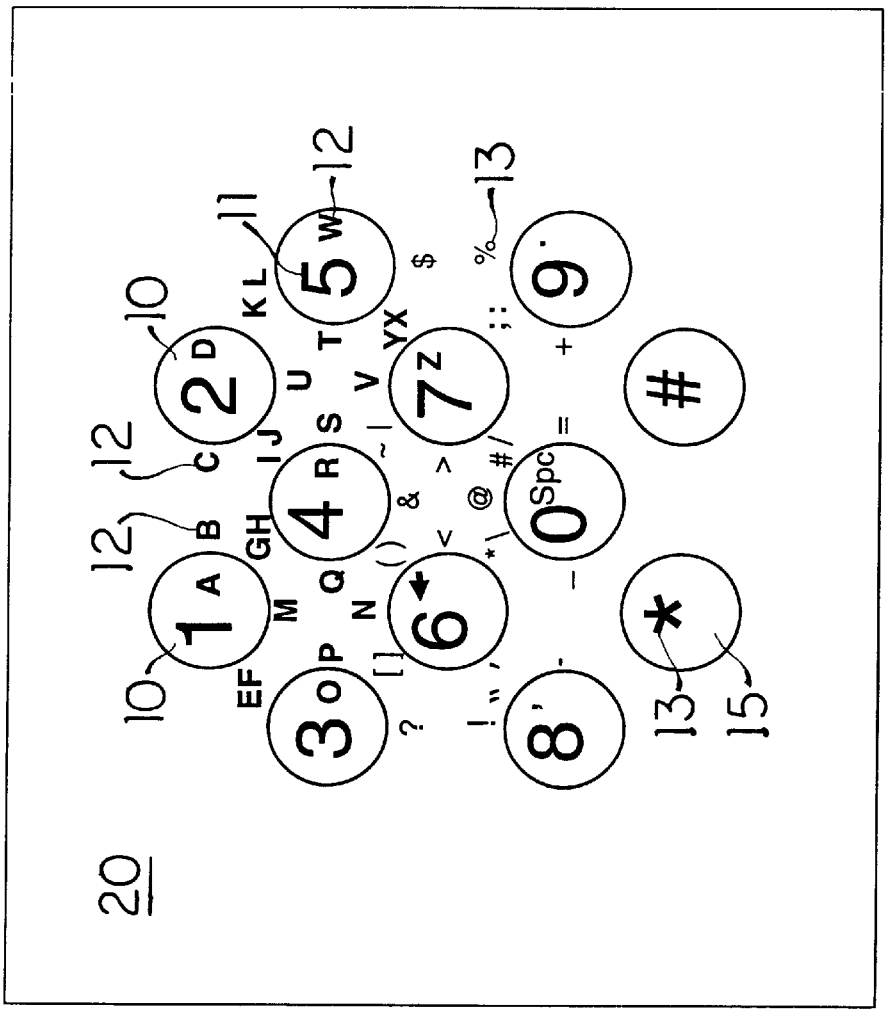
FIG. 14 depicts an alternate diamond pattern twelve key fixed configuration keyboard with offset rows in accordance with the principles relating to the present invention with the additional characters depicted in FIG. 13 and alphabetic characters arranged alphabetically and grouped into an upper zone.

FIG. 13 shows a keyboard 20 similar to that depicted in FIG. 11 possessing 28 punctuation symbols 13 as well as a full complement of 26 alphabetic characters 12 arranged alphabetically which are additional to the standard numeric keypad used on telephones. In contrast to the operation required of the keyboards 20 depicted in FIGS. 9 & 10 repeated sequentially linked keystrokes of the same key 10 are not utilized. Furthermore, both the alphabetic and symbolic characters 12, 13 are grouped in upper and lower zones, similar to the arrangement utilized in upon the keyboard 20 depicted in FIGS. 9 & 10. FIG. 14 shows a keyboard 20 similar to that depicted in FIG. 13 with regard to operation except that the keys 10, 15 are arranged in a diamond pattern with offset rows.

Figure 15:
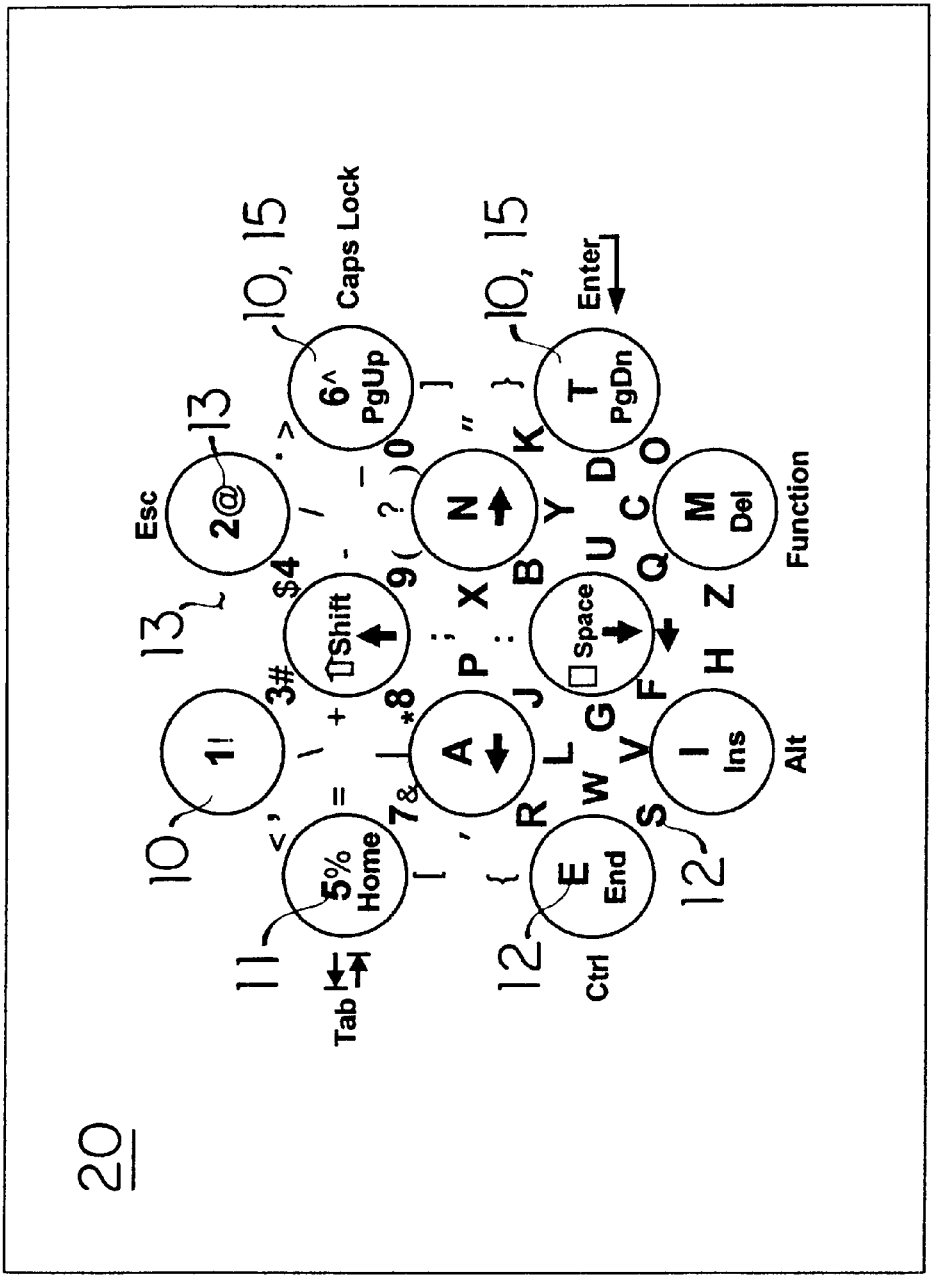
FIG. 15 depicts a preferred keyboard in accordance with the principles relating to the present invention utilizing an alternate diamond pattern twelve key fixed configuration keyboard with offset rows generating the characters and functions typical of a standard notebook keyboard.

FIG. 15 shows a keyboard 20 in accordance with the principles relating to the present invention which provides the full editing features including direction of a cursor about text viewed on a display screen typically found on a 'notebook' type computer with only twelve keys 10, 15 which are arranged in a diamond pattern with offset rows. The symbolic characters 13 each peripherally located adjacent a particular key 10, 15, are generated by repeated keystrokes of that key 10, 15; the functions 'Tab', 'Ctrl', 'Alt', 'Backspace', 'Function', 'Enter', 'Caps Lock', and 'Esc', along with two punctuation marks 13, lateral to the keys 10 bearing 'A' and 'N'. The key 10, 15 labeled ↑ Shift above a solid arrow directed upward effects an alteration between upper case and lower case alphabetic character 12 generation modes with a single keystroke and the same key 10, 15 effects an upward cursor movement in an arrow, i.e. cursor movement, mode.

The arrow mode may be implemented with a repeated keystroke of the key 10, 15 labeled 'M' with 'Del', i.e. delete, underneath and 'Function' shown peripherally adjacent. The key 10 labeled simply '1!' might have an adjacent function indication such as 'Cursor' to indicate arrow mode which would allow the last key 10, 15 to enable another function with repeated keystrokes. The most salient aspect with regard to operation of the keyboard 20 depicted in FIG. 15, as opposed to the keyboards 20 depicted in the preceding figures and discussed above, is the ability to direct cursor movement upon a screen displaying text. While the size of the screen upon a 'notebook' type computer is typically of restricted size in comparison with that utilized on a 'laptop' type computer which, in turn, is relatively restricted in size in comparison with a full size monitor typically utilized for a 'desktop' computer, the ability to navigate the text being typed enables more effective editing, review, and other abilities associated with word processing which are considered fundamental regardless of screen size.

Figure 16:
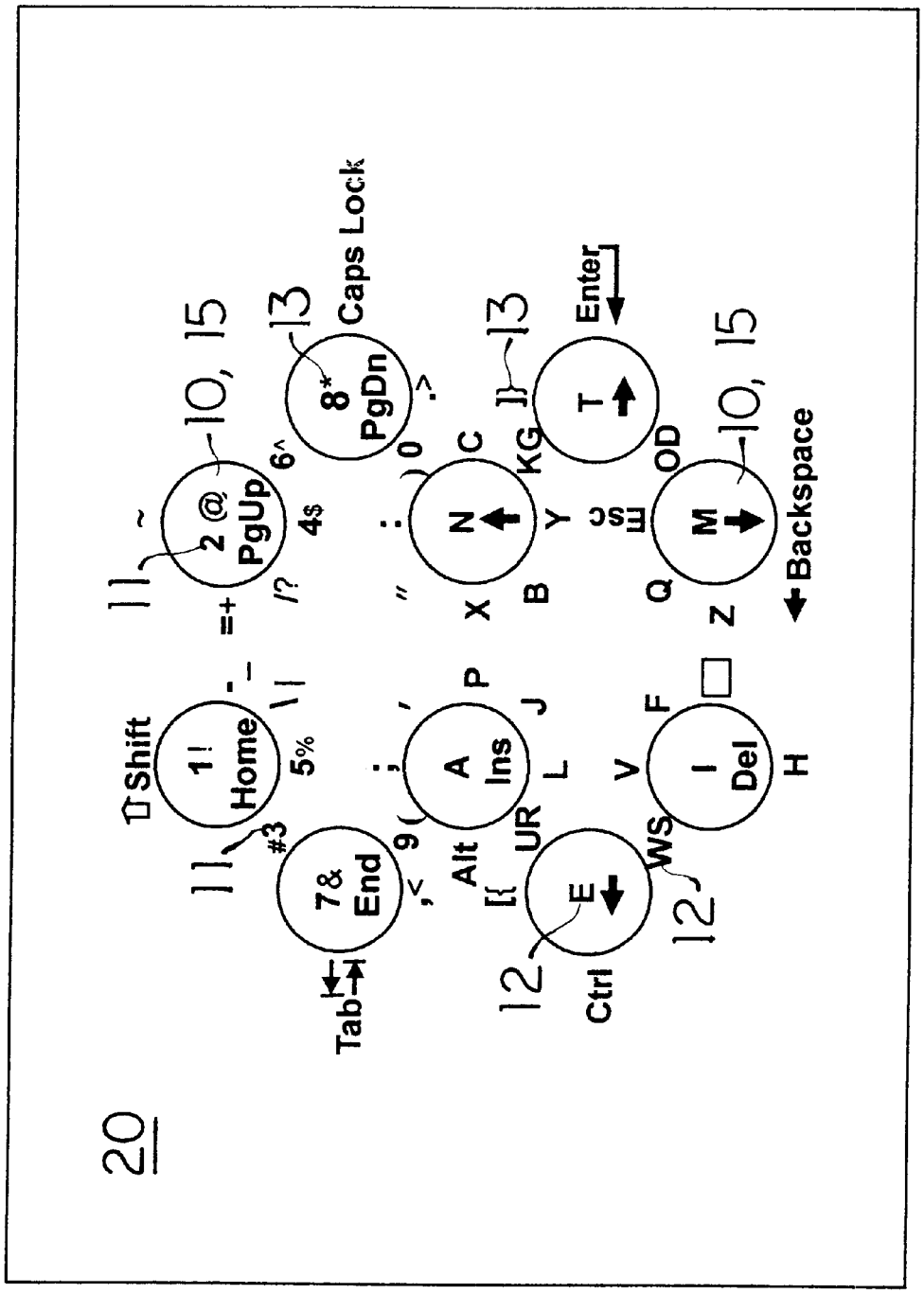
FIG. 16 depicts a staggered ten key fixed configuration keyboard with offset rows in accordance with the principles relating to the present invention generating the essential characters and functions of a standard notebook keyboard.
Figure 17:
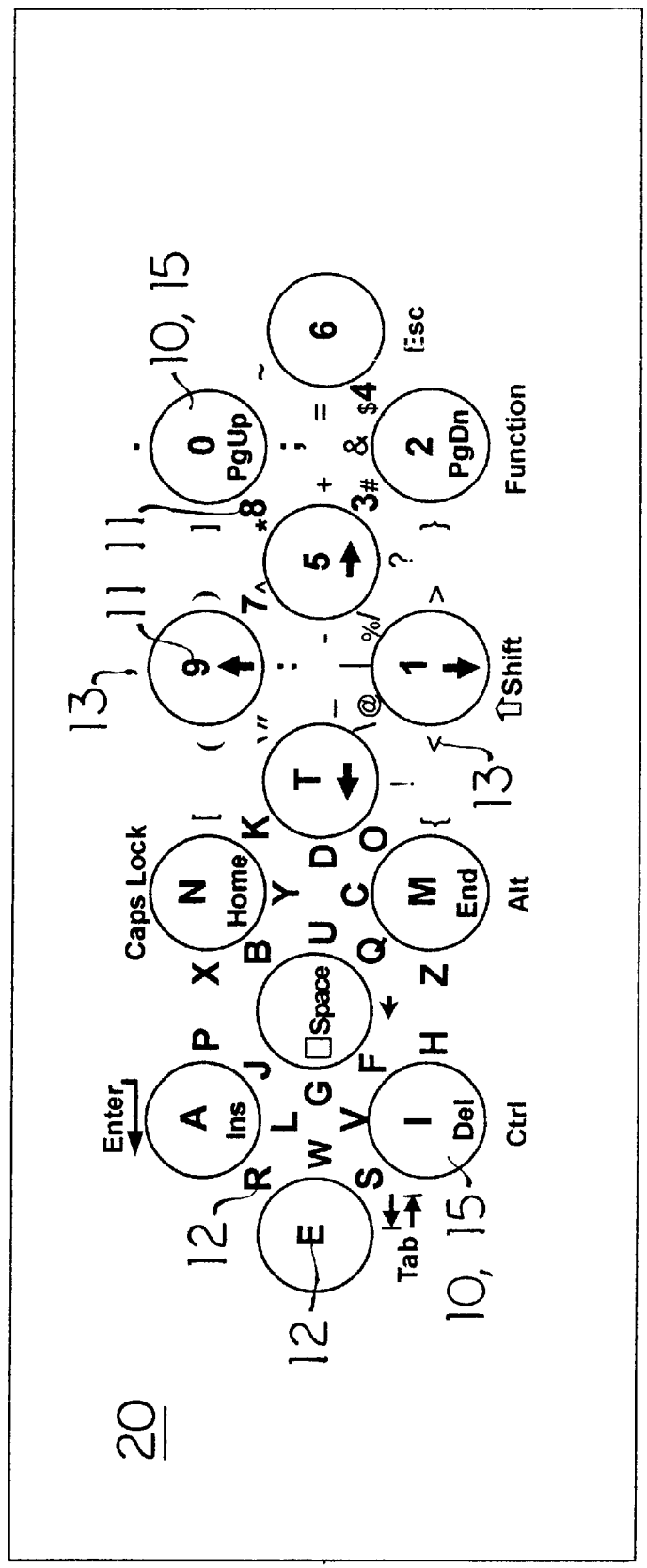
FIG. 17 depicts an offset three row thirteen key fixed configuration in accordance with the principles relating to the present invention generating the essential characters and functions of a standard notebook keyboard.

In order particularly to accommodate operation by persons with restricted motor capabilities the basic capabilities of the keyboard 20 depicted in FIG. 15 are retained with a keyboard 20 possessing only ten keys 10, 15 as depicted in FIG. 16 in which the two central most keys 10, 15 have been removed. FIG. 17 shows a keyboard 20 with the essential capabilities typical to 'laptop' type computers in which thirteen keys 10, 15 are arranged in a diamond pattern of three offset rows including a function key 15. The alphabetic characters 12 are grouped together on the left hand side with those most frequently typed generated with a single keystroke and the numeric characters 11 are grouped together on the right hand side.

Figure 18:
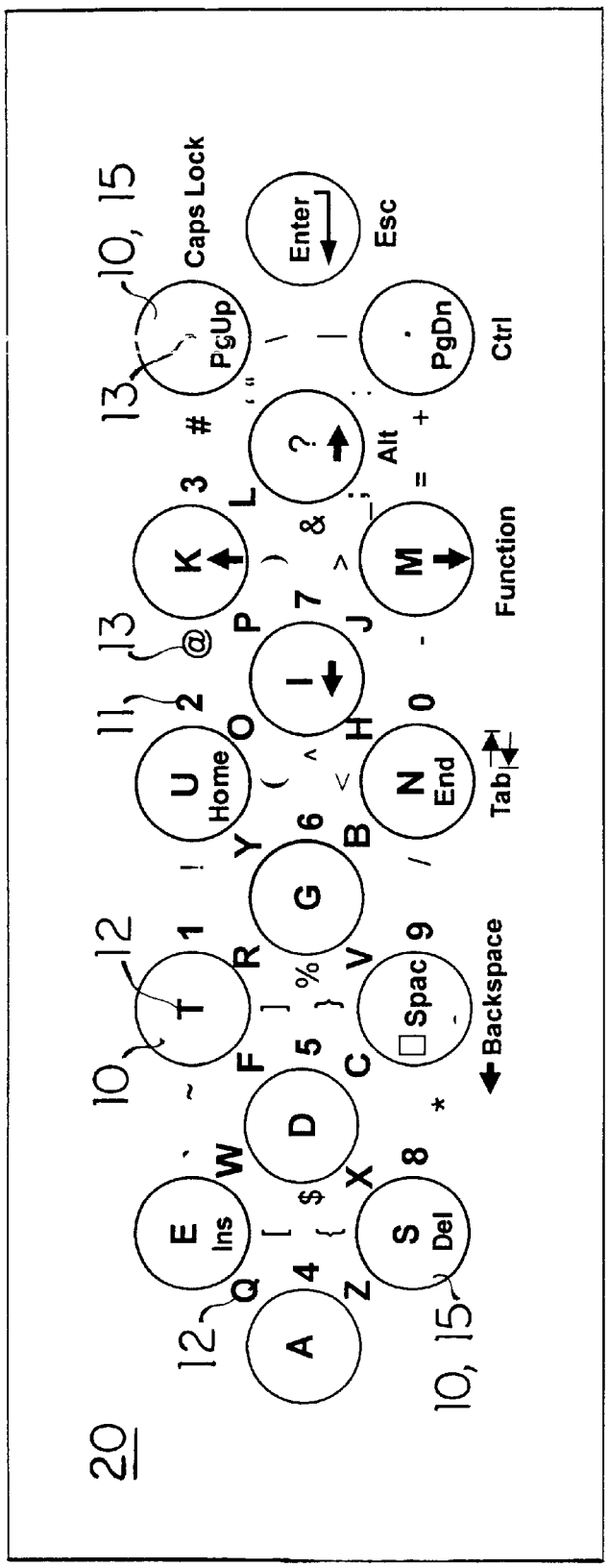
FIG. 18 depicts a keyboard in accordance with the principles relating to the present invention utilizing an offset three row thirteen key fixed configuration generating the essential characters and functions of a standard notebook keyboard.

FIG. 18 shows a keyboard 20 in accordance with the principles relating to the present invention which provides the essential features typically found on a 'laptop' type computer with 16 keys 10, 15 including a function key 15 arranged in a horizontally extended diamond pattern of three offset rows. The alphabetic characters 12 are generated with respect to upper and lower cases not with different modes of operation but with either single or sequentially linked bi-directional pairs of keystrokes as indicated for lower case and repeated single or sequentially linked bi-directional pairs of keystrokes for upper case alphabetic characters 12. For example, a single keystroke upon the key 10 labeled 'A' generates the alphabetic character 12 'a' while a repeated keystroke of the same key 10 generates 'A' and the sequentially linked pairs of keystrokes striking the keys 10, 15 labeled 'A' and 'E' or 'E' and then 'A' generate the alphabetic character 12 'q' while the repeated sequentially linked pairs of keystrokes striking the keys 10, 15 labeled 'E' and 'A' or 'A' and then 'E' generates the alphabetic character 12 'Q'. It is further remarked that numeric characters 11 are generated with sequentially linked unidirectional pairs of keystrokes as are many punctuation symbols 13 as indicated.

Figure 19:
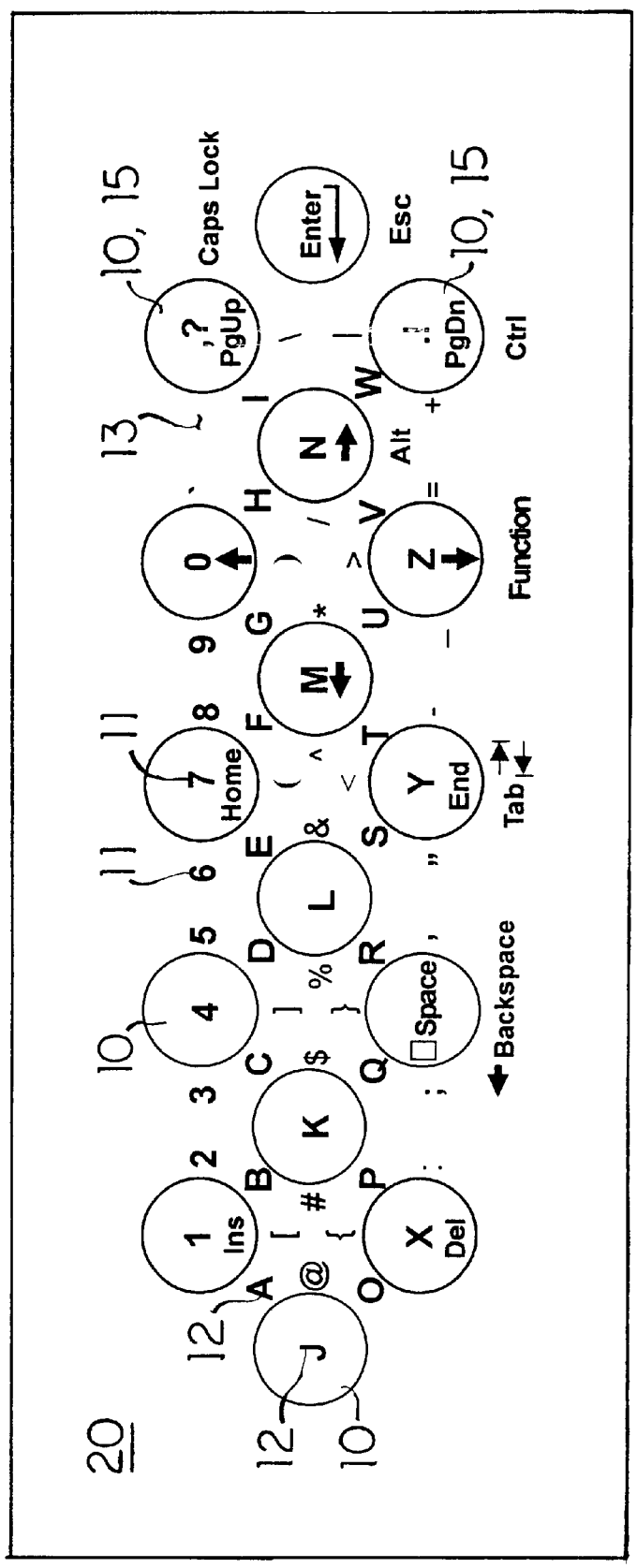
FIG. 19 depicts a keyboard in accordance with the principles relating to the present invention utilizing an offset three row sixteen key fixed configuration generating the essential characters and functions of a standard notebook keyboard and having the numerical characters arranged in ascending order in one row and the alphabetic characters arranged alphabetically.
Figure 20:
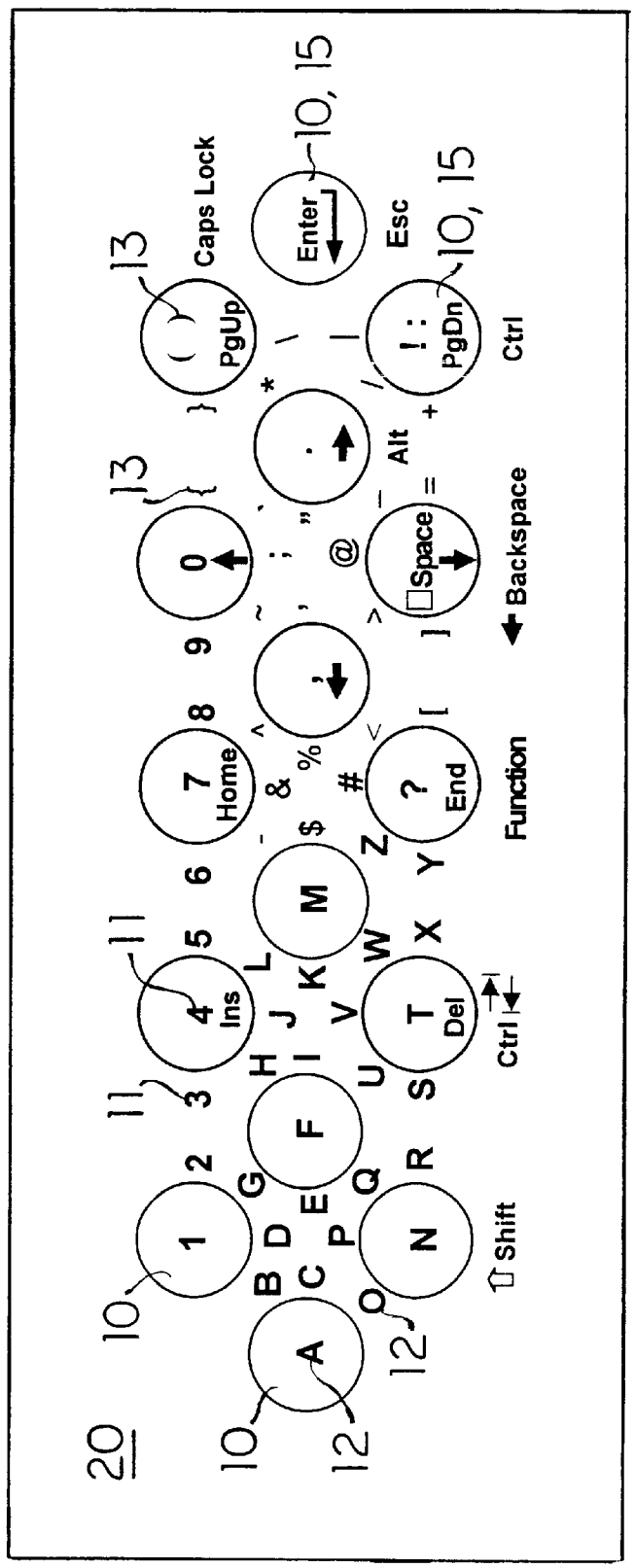
FIG. 20 depicts a keyboard in accordance with the principles relating to the present invention utilizing an offset three row sixteen key fixed configuration generating the essential characters and functions of a standard notebook keyboard and having the numerical characters arranged in ascending order in one row and the alphabetic characters arranged alphabetically in a pattern confined to a zone of the keyboard and the characters for symbols arranged in another zone.

The keyboard depicted in FIG. 19 is similar to the keyboard depicted in FIG. 18 in operation and arrangement of the keys 10, 15 except that the numeric characters 11 are grouped along the top row of keys 10, 15 and the alphabetic characters 12 are alphabetically arranged as shown. The keyboard depicted in FIG. 20 is similar to the keyboard depicted in FIG. 19 in operation and arrangement of the keys 10, 15 except that the alphabetic characters 12 are grouped together in a zone on the left hand side and the punctuation and other punctuation symbols 13 are grouped together in a zone on the right hand side and the 'Shift' key 10, 15 is utilized for alternating between lower case and upper case modes of alphabetic character 12 generation.

It is additionally mentioned that the keyboards 20 depicted in FIGS. 1–20 may be arranged in a circular pattern if desired for accommodation of the utilization of a circulating indication of the keys 10, 15 to be stroked by means of an external switch. Such an arrangement and auxiliary device are considered to be useful particularly by people who possess relatively severe physical disabilities and is discussed in detail below with regard to FIG. 27.

It is further considered that a more conventional type of telephonic device lacks a display screen altogether and no means of visual feedback of text input is available and therefore a backspace function, among others associated with word processing capabilities, is of little practicality. With this in mind it is considered that an embodiment of the principles relating to the present invention otherwise similar to many of the keyboards 20 discussed above would have the key 10, 15 labeled '0' and 'Spc' which generates a '0' with a single keystroke and a space with a repeated keystroke would be essential and a backspace would not be essential for the input of text though a backspace would provide of means of deleting the last known character in the case that it is recognized immediately as a mistake.

It is also commented that in the case of a communication device in accordance with the principles relating to the present invention lacking a display screen that it may be preferred to utilize a particular key for character recognition rather than a fixed or variable threshold interval recognized by the Char-Space Recognizer 30. Using a keyboard of a type similar to the twelve key 10, 15 keypad typical of conventional telephones it is recommended in this case to use the key 10 labeled '0' as a function key 15 wherein a single stroke generates the numeric character 11 '0' and a repeated stroke effects the entry of keystrokes associated with the sending of a segmentation signal.

For an embodiment of the principles relating to the present invention utilizing a fixed threshold interval in conjunction with a Char-Space Recognizer 30 it is recommended that a plurality of fixed values be made available. Fixed threshold intervals of approximately 180 msec, 240 msec, 300 msec, and 360 msec are suggested as representing appropriate values for faster to slower typing speeds. It is strongly recommended that the user be able to select one of a plurality of such values for a fixed threshold.

Figure 21:
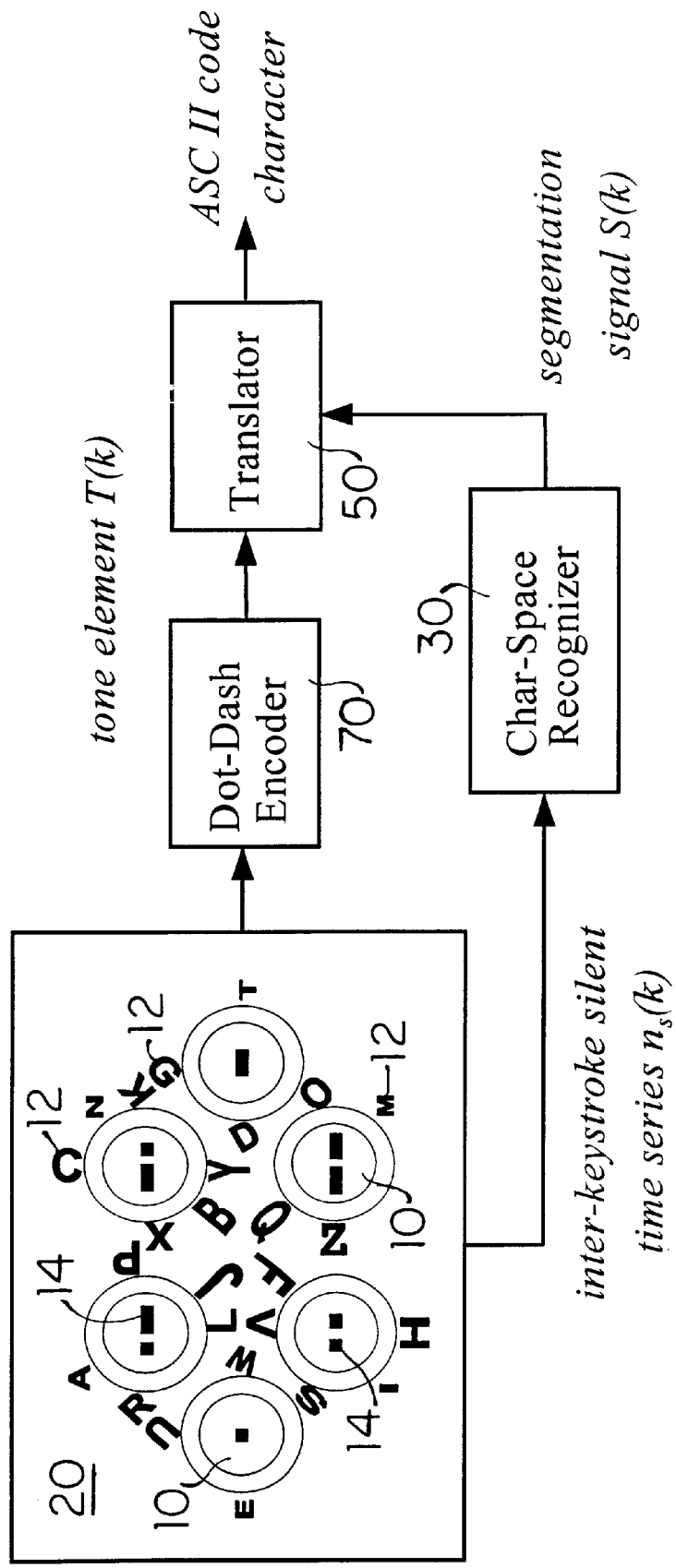
FIG. 21 is a schematic diagram depicting a fixed hexagonal configuration keyboard operating in accordance with the principles relating to the present invention with single and linked sequential pairs of keystrokes generating the alphabetic characters depicted thereupon with recognition of an interval threshold for sequential keystroke linkage.

It is next considered that both the symbols 14 and the method for formulation of alphabetic characters 12 associated with the Morse code might be applied to the principles relating to the present invention with a keyboard 20 such as that depicted in FIG. 21. The six sequentially linkable keys 10 are preferably arranged in a hexagon with appropriate spacing to enable efficient typing by physically impaired persons. Typing with the use of only one hand is, in particular, facilitated. The average number of keystrokes required for all the alphabetic characters 12 is reduced to 1.77. It is further unnecessary to maintain the difference in the length of a tone as providing a distinction between the 'dots' and 'dashes' required of true Morse code transmission.

As further seen in FIG. 21, the small alphabetic characters 12 shown, 'A', 'N', 'E', 'T', 'I', and 'M', adjacent a key 10 are generated with a single keystroke and the other alphabetic characters 12 shown as larger are generated with a uni-directional sequentially linked pair of keystrokes. An intuitive learning of the Morse code is facilitated by locating the alphabetic characters 12 generated in accordance with the single and paired uses of the six basic Morse code symbols 14 borne by the six keys 10. For example, a large 'B' is seen proximate the key 10 bearing a 'dash dot' and is oriented in a manner to point to the key 10 bearing 'dot dot', indicating that the sequentially linked pair of keystrokes dash dot—dot dot will generate the alphabetic character 12 'B'. The reverse sequence, dot dot—dash dot generates the alphabetic character 12 'F'. For purposes of training an audio feedback may be provided so that an operator may focus upon the sound and rhythm of the symbolic characters 14 utilized by Morse code.

Aside from the keyboards 20 FIGS. 1 & 21 are similar in representing similar operational schematics for the generation of alphanumeric characters 12,11 and punctuation symbols 13. In accordance with the schematic seen in FIG. 21, each keystroke is encoded by the Dot-Dash encoder 70 into the tone element series T(k) which is input into the Translator 50. Simultaneously, pauses between single and sequentially linked pairs of keystrokes are input as inter-keystroke silent time series $n_s(k)$ to the Char-Space Recognizer 30 and output as a segmentation signal S(k) to the Translator 50 which generates the corresponding ASCII character. The three methods of implementing the recognition of a character entry discussed above are still applicable. For persons with no or relatively moderate physical handicaps the method of recognition utilizing an adaptive predictive algorithm has proven to be very useful. Those who cannot maintain a relatively steady pause between entries will benefit from the use of a function key 15 dedicated to the recognition required.

Figure 22:
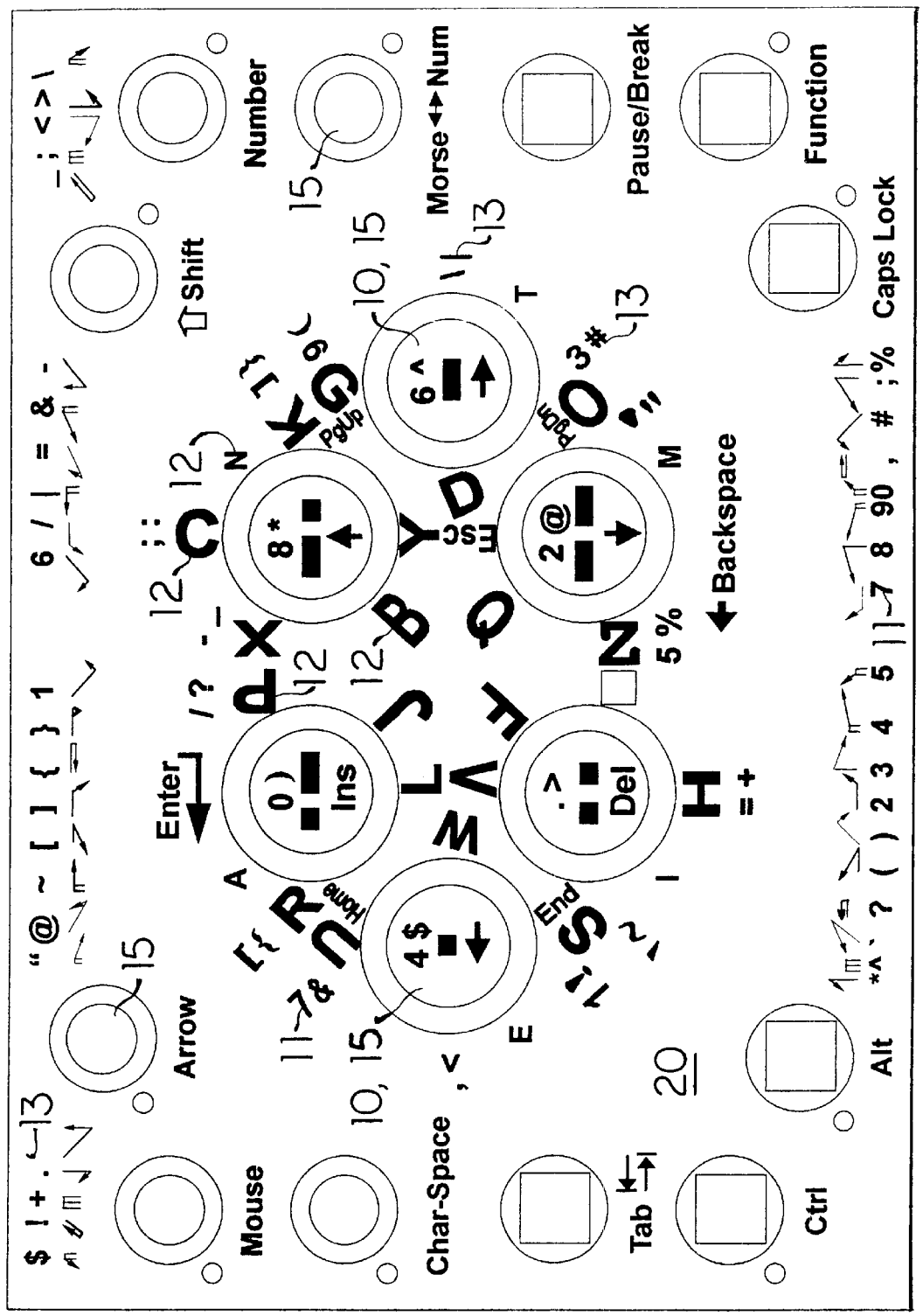
FIG. 22 depicts a keyboard in accordance with the principles relating to the present invention utilizing a fixed hexagonal configuration surrounded by a peripheral pattern of twelve additional keys generating the essential characters and functions of a standard computer keyboard.

FIG. 22 depicts a keyboard 20 in accordance with the principles relating to the present invention which provides four operation modes: Morse, Number, Arrow, and Mouse. Morse is preferred as the default mode which may be changed with selection of mode desired effected by stroking the function key 15 adjacent the appropriate label once with return to the default mode, Morse, being effected by a subsequent single stroke of the same key 15. The Morse mode of operation further preferably includes the additional code, as shown, provided by International Morse Code.

The numeric characters 11 and punctuation and other symbolic characters 13 thus added are generated with three sequentially linked keystrokes in a pattern indicated by the directional arrows seen interiorly adjacent to the additional numeric characters 11 and punctuation symbols 13 which are located along the top and bottom edges of the keyboard 20 in six groups each relating to one of the six keys 10, 15 disposed in the interior hexagonal pattern. The upper left hand group corresponds to the central key 10, 15 centrally labeled with the Morse code symbol 14 'dot dash' while the upper right hand group corresponds to the central key 10, 15 centrally labeled with the Morse code symbol 14 dash dot. As an example, a dollar sign, '$' is generated with the sequentially linked keystrokes dot dash—dot dash—dot.

In the Number mode the numeric characters 11 and punctuation symbol 13 '.', i.e. a period, shown above the Morse code symbol 14 and on the left upon each of the six central keys 10, 15 are generated by means of a single stroke of that key 10, 15 and the punctuation symbols 13 shown above the Morse code symbol 14 and on the right upon each of the six central keys 10, 15 such as '$' on the dot key 10, 15 are generated with repeated keystrokes of that same key 10, 15.

Furthermore, in the Number mode, other numeric characters 11 and symbolic characters 13 shown in radially oriented pairs extending outward from an alphabetic character 12 are generated by means of a single and repeated strokes of the keys 10, 15 labeled with the Morse code symbols 14 when preceded by stroking the key 15 labeled 'Shift'. The symbols 13 ',' for a comma and '\' for a backslash shown in FIG. 22, for example, are generated by means of a single keystrokes of the keys 10, 15 labeled with the Morse code symbols 14 dot and dash, respectively, when preceded by stroking the key 15 labeled 'Shift. The numeric character 11 or symbolic character 13 on the right of the pair, e.g. '<' or '|', is generated in the Number mode with the repeated keystrokes preceded by stroking the key labeled 'Shift'.

The Number mode provides a far more efficient operation for the entering of numerical data in comparison with the number of keystrokes required for true Morse code transmission; less than half the number of keystrokes are required. Operation in a word processing or more general computer screen assisted environment is facilitated by the Arrow and Mouse modes which enable two different means of locating a cursor upon a screen for the purpose of editing text and activating functions available upon the screen. The essential functions provided by these modes are represented both below the Morse code symbol on each of the six central keys 10, 15 and radially interior to certain alphabetic characters 12.

A further function key 15 with the label 'Morse⇌Num' seen below enables temporary changes in mode which will enable savings in keystrokes required in many instances. For example, a period desired while in Morse mode will require the three sequentially linked keystrokes dot dash—dot dot—dot but if the key 10, 15 labeled 'Morse⇌Num' is first struck once a single stroke of the key 10, 15 labeled 'dot dot' will generate a period. It is further preferred that this mode change revert immediately back to the Morse operation mode after input of a single character in Number mode.

It is also considered that, as mentioned earlier, a circulating indicator utilized in conjunction with an external switch may be utilized. Operation with this addition employs what is called a scanning strategy for circulation among the keys 10, 15 by which each may be selected and stroked with an external switch. For the keyboard 20 depicted in FIG. 22 it is suggested that two scanning cycles be utilized, one for the central six keys 10, 15, and another for the peripherally located function keys 15. In this case an additional key 15 may be utilized to provide a function alternating operation of the scanning strategy between the two circulations. This will enable operation with only one external switch 33. It is further suggested that the circulating indicator comprise the sequential lighting of a dwell indicators 17, 19 as discussed in detail with regard to FIG. 27 below. A scanning strategy such as this is considered to be of use particularly by users possessing a physical or neurological disability restricting motor coordination or otherwise adversely affecting the full use of even one hand.

Figure 23:
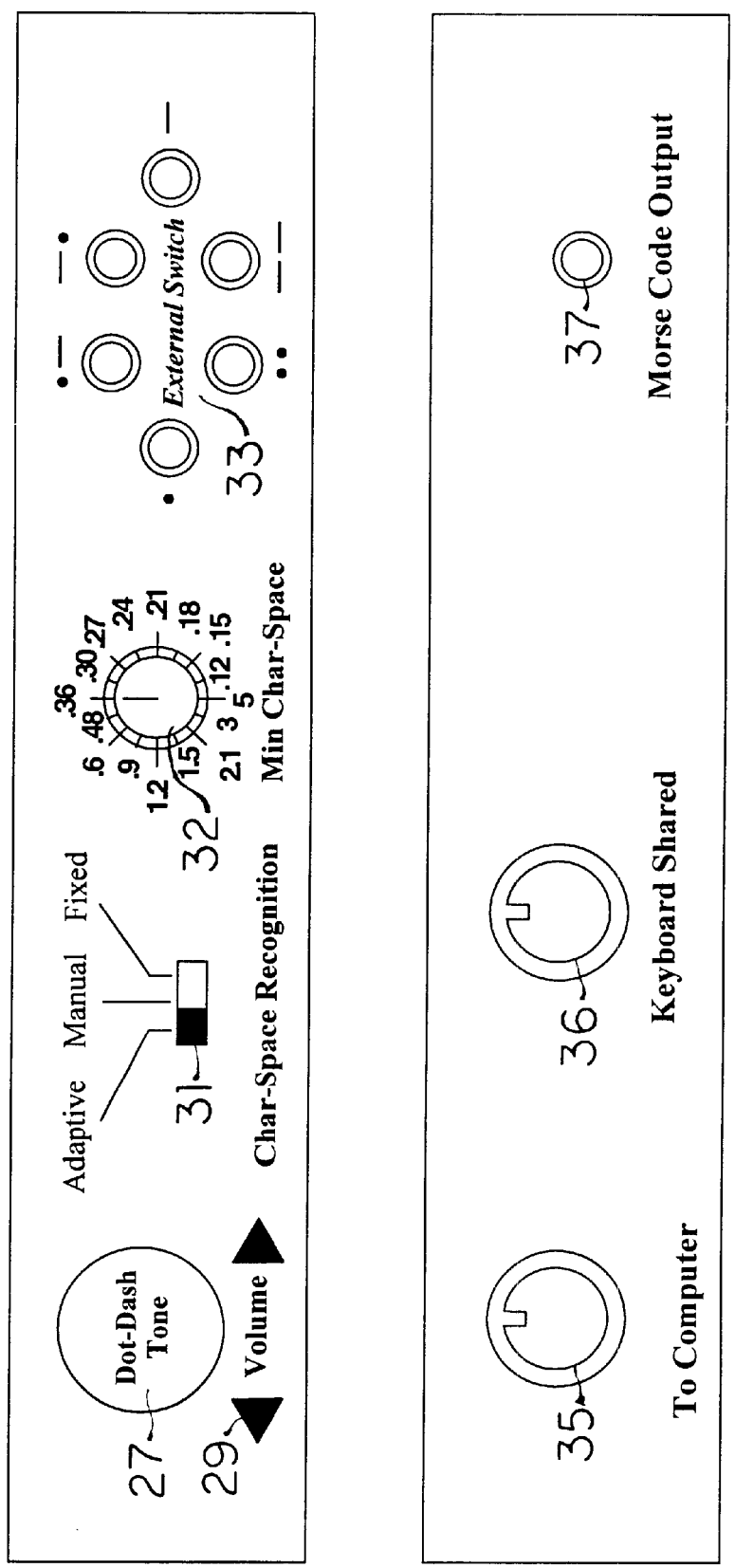
FIG. 23 depicts a keyboard interface intended for use in conjunction with the keyboard of FIG. 22.

FIG. 23 depicts an interface suggested for utilization of the keyboard 20 depicted in FIG. 22 in accordance with the principles relating to the present invention. In the lower half of the interface depicted therein one may see a primary computer jack 35 comprising a functional linkage for a primary computer which is labeled 'To Computer', a standard keyboard jack 36 comprising a functional linkage to a standard keyboard for concurrent use of another, standard computer type, keyboard which is labeled 'Keyboard Shared', and a Morse keyboard jack 37 labeled 'Morse Code Output' comprising a functional linkage for a keyboard 20 in accordance with the principles relating to the present invention, particularly a keyboard 20 such as that depicted in FIGS. 22 & 27 utilizing sequentially linkable keys 10 labeled with Morse code symbols 14.

In the upper panel of the interface depicted in FIG. 23 a recognition mode selector 31 is seen which enables selection of 'Adaptive', 'Manual' and 'Fixed' modes. These modes utilize: (1) an adaptive predictive algorithm for automatic and adaptive setting of the value of the threshold interval utilized in character recognition; (2) manual character recognition with the stroking of a given key 15; (3) setting of a fixed value for the threshold interval utilized with the interval selector 32 labeled 'Min Char-Space' which is represented as a dial marked with values in seconds from 0.12 minimum to 5 maximum. In the same panel one may see a set of six functional linkages for an external switch 33 each labeled with a Morse code symbol 14 with the label 'External Switch' therebetween which enable control of the central six keys 10, 15 in FIG. 22 with the use of an external switch 33 which is intended to be used with a scanning strategy for selecting keystrokes as discussed below in further detail in relation to FIG. 27. Further present in the upper panel of the interface depicted in FIG. 23 is an annunciator 27 labeled 'Dot-Dash Tone' below which are seen two control buttons 29 with 'Volume' therebetween which enables audio feedback for the user.

Operation of the system in accordance with the principles relating to the present invention utilizing a keyboard 20 such as that depicted in FIG. 22 and the interface depicted in FIG. 23 may be pursued as follows. First a user selects one of the three modes of character recognition: adaptive, manual, or fixed. The manual mode is intended for persons who cannot utilize the other two modes and is facilitated by the key 15 labeled 'Char-Space' in FIG. 22 wherein the stroking of the said key 15 in the manual mode causes generation of a segmentation signal as shown in FIG. 21 in recognition of the previous keystroke(s) as a character. In the fixed mode users can select the threshold interval utilized in character recognition with the interval selector 32 depicted in the upper half of FIG. 23 from among sixteen set values. In the adaptive mode the threshold interval automatically adapts to the user's typing speed, however, an initial value must be selected for initialization of the adaptive predictive algorithm utilized.

Figure 24:
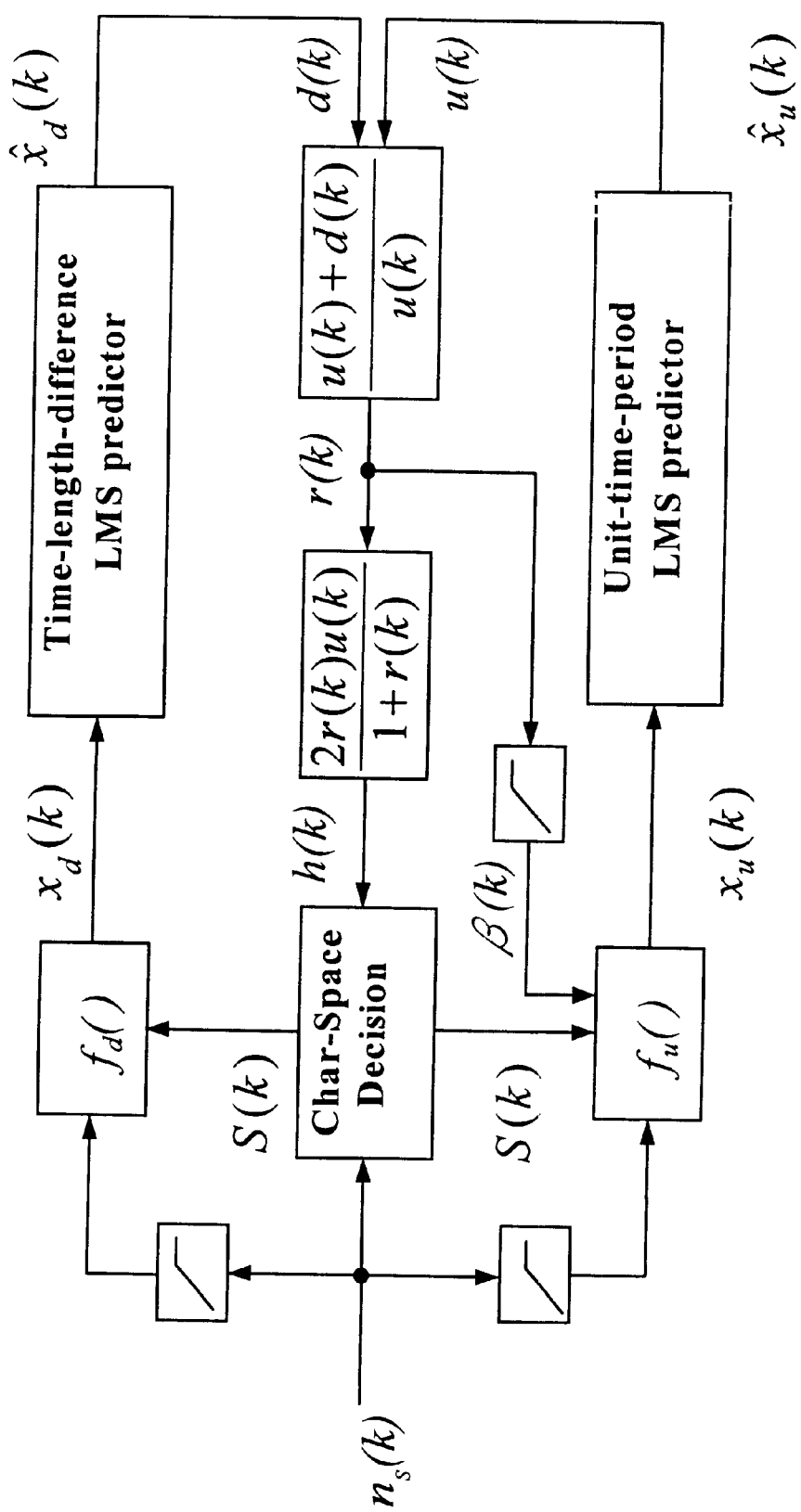
FIG. 24 is a schematic depicting a preferred adaptive predictive algorithm for use as the character-space recognizer shown in FIGS. 1 & 21.

FIG. 24 depicts a preferred adaptive predictive algorithm for utilization by the Char-Space Recognizer 30 in adaptive character recognition in accordance with the principles relating to the present invention. In order to analyze a users' unstable inter-keystroke space time series, two Least Mean Square (LMS) predictors are used to predict the unit time period, (i.e. the interval between keystrokes), and the difference between link-space and character-space intervals. Following is a description of the adaptive predictive algorithm suggested.

The input signal of the unit-time-period LMS predictor is given as $$x_u(k) = f_u(n_S(k)) \quad \text{if} \quad n_S(k) < n_{Smax} \quad (1)$$
$$= f_u(n_{Smax}) \quad \text{if} \quad n_S(k) \geq n_{Smax}$$

where $n_{Smax}$ is the upper limit of $n_s(k)$; and the transfer function $f_u(\cdot)$ is defined by $$f_u(n_S(k)) = n_S(k) \quad \text{if} \quad S(k) = \text{a 'link space'} \quad (2)$$
$$= n_S(k)/\beta(k) \quad \text{if} \quad S(k) = \text{a 'character space'}$$

where S(k) is the output of the character-space decision rule at iteration k, $$\beta(k) = r(k) \quad \text{if} \quad r(k) < \beta_{max}$$
$$= \beta_{max} \quad \text{if} \quad r(k) \geq \beta_{max} \quad \text{wherein}$$

r(k) defined by equation (7) below is the predicted unstable inter-keystroke space ratio.

Then, the predicted unit time period u(k) at iteration k can be obtained from the output of the predictor, that is $$u(k) = \hat{x}_u(k). \quad (3)$$

For the time-length-difference LMS predictor, the input signal is given as $$x_d(k) = f_d(n_S(k)) \quad \text{if} \quad n_S(k) < n_{Smax} \quad (4)$$

-continued
$$= f_d(n_{Smax}) \quad \text{if} \quad n_S(k) \geq n_{Smax}$$

wherein the transfer function $f_d(\cdot)$ is defined by $$f_d(n_S(k)) = d(k) + u(k) - n_S(k) \quad \text{if} \quad S(k) = \text{a 'link-space'} \quad (5)$$
$$= n_S(k) - u(k) \quad \text{if} \quad S(k) = \text{a 'character-space'}$$

where d(k) denotes the predicted difference between link-space and character-space intervals at iteration k and is given by the output of the predictor as follows $$d(k) = \hat{x}_d(k). \quad (6)$$

According to u(k) at equation (3) and d(k) at equation (6), the unstable inter-keystroke space ratio can be predicted by $$r(k) = (u(k) + d(k))/u(k) \quad (7)$$

and the adaptive threshold for inter-keystroke space time series at iteration k is expressed as $$h(k) = 2(r(k)u(k))/(1+r(k)). \quad (8)$$

The character-space decision rule is accordingly summarized as $$S(k) = \text{a 'link space'} \quad \text{if} \quad n_S(k) \leq h(k) \quad (9)$$
$$= \text{a 'character space'} \quad \text{if} \quad n_S(k) > h(k).$$

As a result, h(k) is the adaptive threshold to distinguish between a 'link-space' and a 'character-space', and its value keeps updating by tracing the user's speed using the adaptive predictive algorithm discussed above. An adaptive recognition method utilizing the adaptive predictive algorithm discussed above is considered superior to certain other methods previously proposed by the present applicant in certain journals: i.e. "A Morse-Coded Recognition System with LMS and Matching Algorithms for Persons With Disabilities", Ching-Hsiang Shih and Ching-Hsing Luo, *International Journal of Medical Infornatics*, Vol.44:193, p. 202, 1997; "Chinese Morse Code Communication Auxiliary System for the Disabled", Ching-Hsing Luo, Ching-Hsiang Shih, and Ching-Tang Shih, *Chinese Journal of Medical and Biological Engineering in Taiwan*, Vol.16, No.2:175, p. 186, 1996; "Adaptive Morse-Coded Single-Switch Communication System for the Disabled", Ching-Hsing Luo and Ching-Hsiang Shih, *International Journal of Biomedical Computing*, 41:99, p. 106, 1996. Detailed descriptions may be found in the above referenced articles.

It is generally considered that if a person can keep a stable typing speed normally the chance for incorrect recognition is very little for the adaptive or fixed recognition methods. Use of a keyboard 20 in accordance with the principles relating to the present invention by someone able to maintain a stable typing speed is therefore considered to be of obvious practicality. For many disabled people, however, maintenance of a stable typing speed is often very difficult and fixed recognition becomes impractical. Use of the adaptive recognition operation by a person so disabled has been shown, however, to be practical. Following is a description of a case study performed through agency of the applicant.

For the experiment, the six key 10, 15 keyboard 20 depicted in FIG. 21 was utilized to determine improvement in Morse code test typing performance of a fifteen year old boy diagnosed as having mild-quadriparesis-athetoid cerebral palsy with noted fluctuating tone and predominate hypertonias of the bilateral upper limbs. The subject's voluntary movements were accessible, but there was an initial delay before a movement was begun. His involuntary movement was presented with fast and writhing patterns, which were increased by excitement. The effort to make a voluntary movement partially disrupted his willed movement making it uncoordinated.

The subject attended a special class for students with developmental disabilities at a junior high school. Reports in his school cumulative records indicated that he showed a readiness for learning at the grade-three level, (equivalent to grade level nine in North America), so most of the time he attended a grade three class with normal students at the same school. In elementary school, he had been introduced to the computer and early learning software. Learning to use a standard keyboard was tiring and unsuccessful due to his athetosis fine motor skills. Long afterward, he received four months of Morse code typing training with a single telegraph type switch using the thumb of his left hand. His mean typing rate was 3.39 words per minute (WPM) with an average 84.6% recognition rate by an automatic recognition device.

The training program using the keyboard 20 represented in FIG. 21 was conducted eight months after his single-switch training. During the training period, an interactive training system with immediate Morse alphabet and dot-dash tone feedback was employed to provide the subject with means for developing a stable and fast typing training. The training system was interfaced with the keyboard 20. To provide typing rate training, the threshold interval could be set at 240, 270, 300, 360, 420, or 480 milliseconds. The pause interval between two adjacent Morse alphabetic characters had to be kept longer than the selected threshold interval so that the subject could learn to type both stable sequentially linked keystrokes and pause intervals.

Because of the poor coordination of the subject's right hand he preferred practicing with his left hand only. Before training the subject was given the layout of the keyboard as shown in FIG. 21 and a half-hour practice lesson to become familiar with the six key 10, 15 typing method as described above. The recording of baseline data was executed following the practice lesson. After that the training program began with a ten minute learning period in the use of the training system, followed by a six session training program. Each session took one hour during which the subject practiced typing the 26 Morse alphabetic characters 12 in ascending order and a 100 alphabetic character 12 sentence three times. The training program continued for three weeks. The present character-space interval for the adaptive recognition was set at 480 ms in the first session and reduced step by step to 240 ms in the final session. During the third session, the subject was encouraged to practice without looking at the keyboard 20. He achieved intuitive typing with maximum comfort and ease after the fifth session.

The tests were given during the baseline data recording period and one day after each training session. The 100 alphabetic character 12 sentence was used for the test. Each test was repeated three times. The subject's typing rate was calculated in WPM, with five alphabetic characters 12 considered as one word. The adaptive threshold Char-space Recognizer 30 as shown in FIG. 24 was utilized to measure the recognition rate of the typing. Each measurement was calculated as an average of the three repeated tests in each test period.

Figure 25:
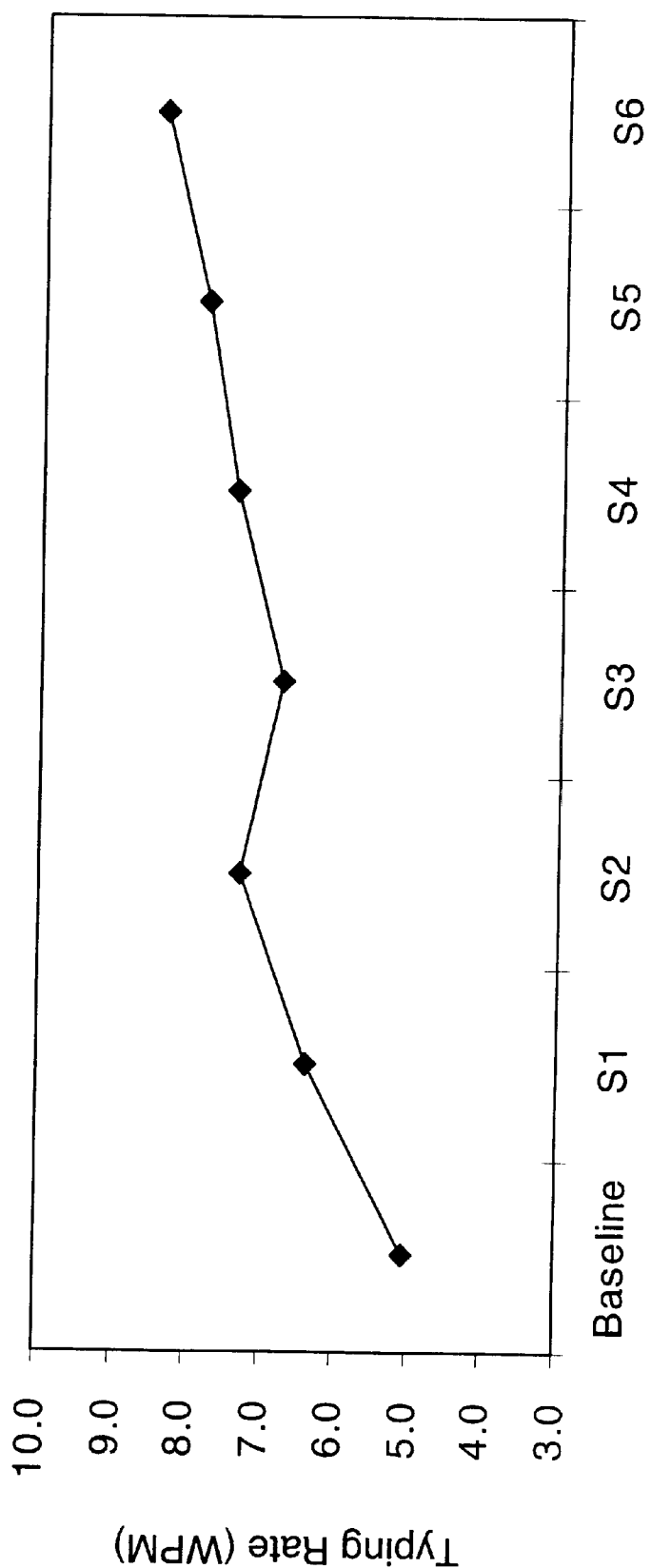
FIG. 25 is a graph depicting the improvement in a subject's typing rate over time operating the keyboard system depicted in FIG. 21.
Figure 26:
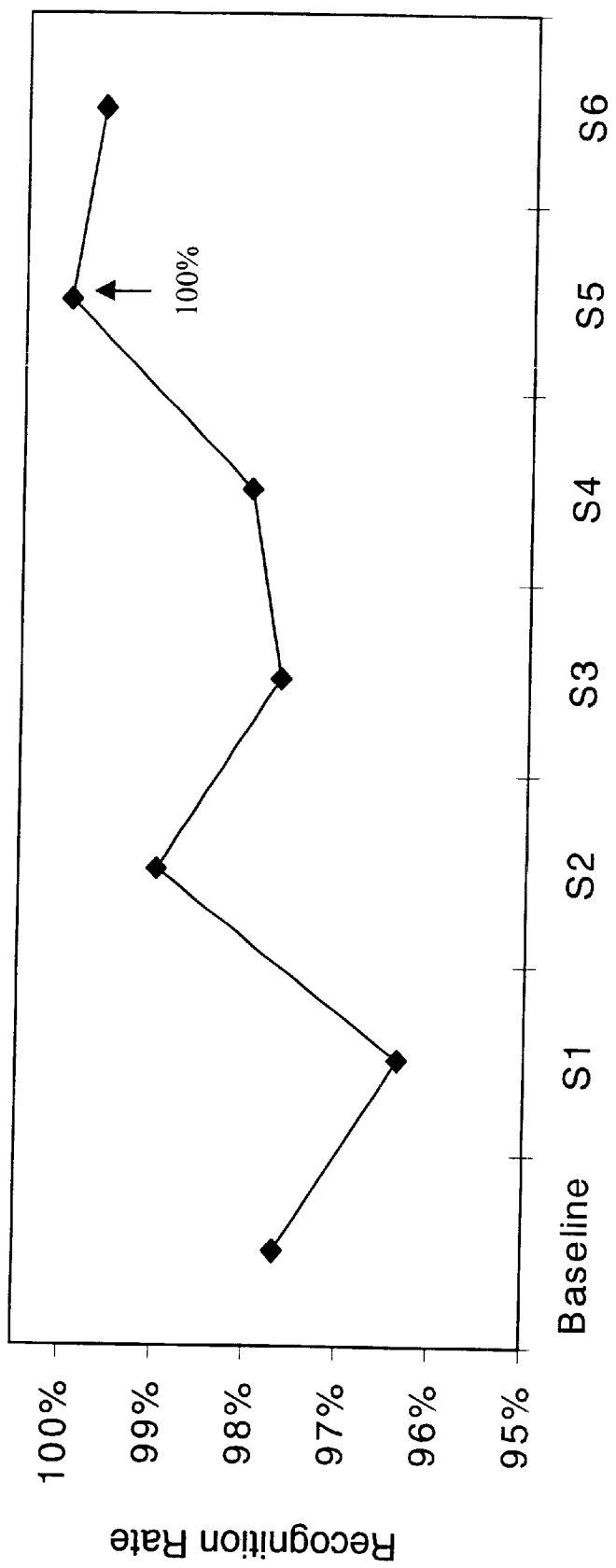
FIG. 26 is a graph depicting the improvement in the recognition rate yielded by the use of the algorithm depicted in FIG. 24 over time for a subject operating the keyboard system depicted in FIG. 21.

FIG. 25 shows the improvement in the subject's typing rate versus training sessions. The subject's typing rate increased gradually from a baseline 5.04 WPM to a final 8.4 WPM using the palm of his left hand. A speed drop at the third session occurred mainly because the subject tried at first to type without looking at the keyboard 20. It was apparent that the subject had also improved in the rate of recognition which increased from a baseline of 97.7% to a final 99.7% as shown in FIG. 26.

Figure 27:
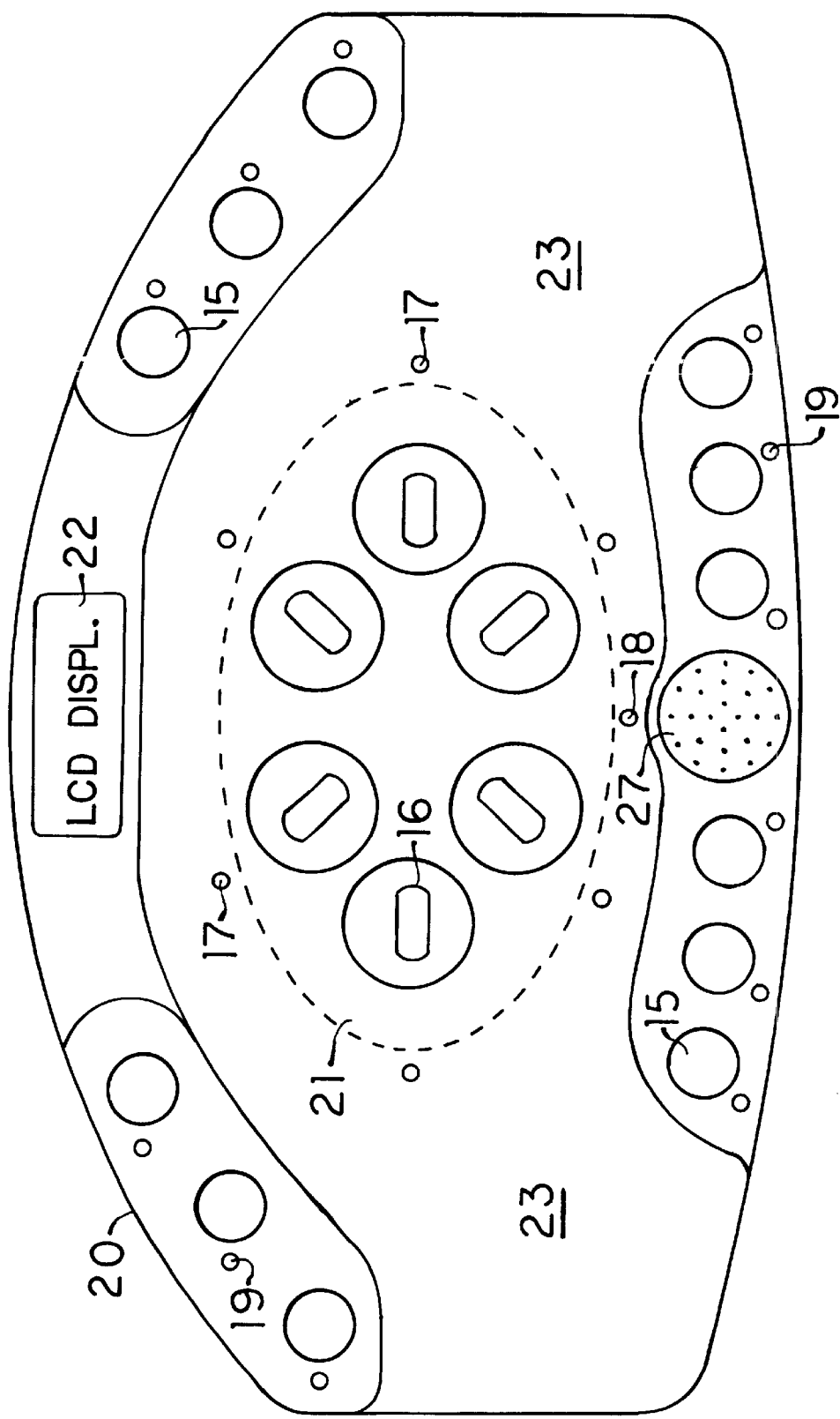
FIG. 27 depicts a practice keyboard possessing a layout similar to the keyboard depicted in FIG. 22 further possessing a display and annunciator for training purposes.

FIG. 27 depicts a practice keyboard 20 similar in operation to the keyboard 20 depicted in FIG. 22 with six centrally located keys 10, 15 which, in contrast to the keys 10, 15 depicted in FIG. 22, can be adjusted with regard to proximity with each other. Each of the six centrally located keys 10, 15 seen in FIG. 27 can be radially displaced within a certain range as provided by slots 16 into which each key is slidably mounted. Also, the central area 21, as indicated by an oval dotted line, possesses a lower elevation or height with respect to the surrounding keyboard 20 which compensates for the height of the six central keys 10, 15 so that the user need not lift their hands uncomfortably while typing. Twelve additional function keys 15 are located in the upper corners and along the bottom of the keyboard 20. An annunciator 27 is also located along the bottom in the middle and a LCD (Liquid Crystal Diode) Display 22 is seen in the middle of the top of the keyboard 20 and which is intended to be used in training when the keyboard 20 is not connected to a computer and monitor. The annunciator 27 provides the audio feedback mentioned above with regard to learning the Morse code.

A scanning strategy for circulation among all the keys 10, 15 as mentioned earlier is similarly facilitated by the use of LEDs (Light Emitting Diodes) as dwell indicators 17, 19 each associated with one key 10, 15. Each dwell indicator 17, 19 indicates that, when lit, closing of an external switch will effect a stroking of that key. Two circulation paths or scanning strategies are further recommended: circulation among the six central keys 10, 15 with a dwell at each indicated by the central dwell indicators 17 each located on a radial axis associated with each of the central six keys 10, 15; and circulation among the twelve function keys 15 with a dwell at each indicated by the peripheral dwell indicators 19 each located proximate one of the peripherally located function keys 15. Alternation between the two different circulation paths is effected with closing of the external switch when indicated by a path indicator 18 which is shown as an LED located above the annunciator 27 which is lit in sequence during scanning in either circulation path.

It is further noted with regard to the practice keyboard 20 depicted in FIG. 27 that the lower left and right areas upon the same are free of keys. It is recommended that these areas comprise substantially smooth and uninterrupted surfaces to provide the user with a suitable platform 23 for resting the heel of their hands while typing. It is considered that the layout of the keys 10, 15 in the manner depicted in FIG. 27 and described above including the provision of these two platforms 23 and grouping of the keys 10, 15 into central and peripheral dispositions achieves an ergonomic keyboard 20 in accordance with the principles relating to the present invention which is effective in combatting fatigue for many users.

It is also emphasized that while the generation of alpha-numeric characters 12, 11 and punctuation symbols 13 in the manner described with the keyboard 20 depicted in FIG. 22 is specifically intended for the keyboard depicted in FIG. 27 many of the features described directly above in association with the keyboard depicted in FIG. 27 may be applied to the keyboards 20 depicted in the other figures and discussed earlier. The use of dwell indicators 17, 19 in conjunction with an external switching device is applicable to all the embodiments in accordance with the principles relating to the present invention as is the use of an LCD Display 22. The use of an annunciator 27 is considered to be especially applicable to those keyboards 20 utilizing six keys 10, 15 labeled with Morse symbols 14. The ergonomic features pertaining to the keyboard 20 depicted in FIG. 27 are further considered to be applicable to the other keyboards 20 discussed earlier.

The above is intended to provide one practiced in the art with a detailed description of the best known manner of making and using an embodiment in accordance with the principles relating to the present invention; the same is not to be construed as in any manner restrictive of the scope of the present invention or the rights and privileges acquired by Letters Patent for which I claim:

1. A keyboard system suited for one-handed entry of information into a digital device comprising:
   a plurality of keys in a fixed configuration each labeled by a first character generated by a single keystroke of the key wherein the sequential stroking of two adjacent keys generates a second or a third character;
   an encoder connected to the plurality of keys that generates a unique key code in response to stroking of each key;
   a function key that outputs an enter signal when stroked or a threshold timer that outputs an enter signal when a predetermined threshold interval between keystrokes has been exceeded;
   a translator that outputs a character code upon receipt of one or two key codes and an enter signal, said character code corresponding to:
   a) a first character when one single key code and said enter signal are received,
   b) a second character when two key codes in a sequential order and said enter signal are received,
   c) a third character when two keys codes in a reverse sequential order and said enter signal are received.

2. The keyboard system of claim 1 having said sequential order determined by representation of said second character proximate the key struck first.

3. The keyboard system of claim 1 having said sequential order determined by representation of said second character proximate the key struck second.

4. The keyboard system of claim 1 having a fourth character represented proximate one key, but not between two keys, that is generated by said translator upon receipt of the key code for said one key twice and said enter signal.

5. The keyboard system of claim 1 having a full range of ten numeric characters each generated with a particular sequence of keystrokes.

6. The keyboard system of claim 1 having a plurality of punctuation symbols each generated with a particular sequence of keystrokes.

7. The keyboard system of claim 1 wherein said adjacent pair of keys are horizontally adjacent.

8. The keyboard system of claim 1 wherein said adjacent pair of keys are vertically adjacent.

9. The keyboard system of claim 1 wherein said adjacent pair of keys are diagonally adjacent.

10. The keyboard system of claim 1 further including an annunciator.

11. The keyboard system of claim 1 further including a visual display.

12. The keyboard system of claim 11 including a liquid crystal diode visual display.

13. The keyboard system of claim 1 having alphabetic characters generated with one group of keys and symbolic characters generated with another group of keys.

14. The keyboard system of claim 13 wherein the group of keys generating alphabetic characters is separated from the group of keys generating numeric characters.

15. The keyboard system of claim 1 wherein said fixed configuration of keys is comprised of a plurality of offset rows.

16. The keyboard system of claim 15 wherein said fixed configuration of keys comprises a diamond pattern.

17. The keyboard system of claim 1 possessing a plurality of centrally grouped and peripherally disposed keys.

18. The keyboard system of claim 17 possessing two platform areas each having a substantially smooth surface for resting the heel of a hand.

19. The keyboard system of claim 18 wherein the platform areas are raised with respect to the centrally grouped keys.

20. The keyboard system of claim 1 having a fill range of alphabetic characters each generated with a particular sequence of keystrokes.

21. The keyboard system of claim 20 wherein each alphabetic character is generated with a sequentially linked pair of keystrokes.

22. The keyboard system of claim 21 having upper case alphabetic second characters and lower case alphabetic third characters generated with reversed sequentially linked pairs of keystrokes.

23. The keyboard system of claim 1 wherein said fixed configuration of keys is comprised of twelve keys arranged in three columns and four rows.

24. The keyboard system of claim 23 wherein ten of said twelve keys are each labeled with one of the ten numeric characters 0–9 and two of said twelve keys are each labeled with one symbolic character.

25. The keyboard system of claim 24 wherein one of said two keys labeled with a symbolic character comprises a function key generating a signal different than said enter signal.

26. The keyboard system of claim 1 having a plurality of alphabetic characters represented which each indicate by location a sequentially linked pair of keystrokes for generation.

27. The keyboard system of claim 26 wherein a full range of twenty-six alphabetic characters are represented.

28. The keyboard system of claim 27 wherein the representation of the alphabetic characters is arranged alphabetically to facilitate intuitive learning.

29. The keyboard system of claim 1 having a plurality of keys each labeled with an alphabetic character and a numeric character each respectively generated with a single keystroke of that key in an alphabetic or a numeric character generation mode.

30. The keyboard system of claim 29 wherein alternation between alphabetic and numeric modes is effected with a particular sequence of keystrokes.

31. The keyboard system of claim 29 wherein alternation between alphabetic and numeric modes is effected with a single keystroke.

32. The keyboard system of claim 31 wherein a single keystroke of a key labeled with a symbolic character effects alternation between alphabetic and numeric modes.

33. The keyboard system of claim 1 having six of said keys arranged in a hexagon.

34. The keyboard system of claim 33 wherein alphabetic characters are represented proximate said six centrally located keys arranged in a hexagon.

35. The keyboard system of claim 34 wherein representation of said alphabetic characters indicates by location sequentially linked keystrokes generating each alphabetic character.

36. The keyboard system of claim 33 wherein each of said six centrally located keys arranged in a hexagon is labeled with a Morse code symbol.

37. The keyboard system of claim 36 wherein characters are generated with single and sequentially linked keystrokes in accordance with the Morse code.

38. The keyboard system of claim 37 wherein alphabetic and numeric characters are generated with single and sequentially linked keystrokes in accordance with the Morse code.

39. The keyboard system of claim 38 wherein all the characters of International Morse Code are generated with single and sequentially linked keystrokes in accordance with the Morse code.

40. The keyboard system of claim 33 further possessing a plurality of peripherally disposed keys.

41. The keyboard system of claim 40 wherein at least one said peripherally disposed key comprises a function key generating a signal different than said enter signal.

42. The keyboard system of claim 41 wherein a mode change function key provides alternation between two different character generation modes in which different characters are generated with the same keystroke or keystrokes.

43. The keyboard system of claim 42 wherein numeric characters and punctuation symbols are generated in a numeric character generation mode.

44. The keyboard system of claim 42 wherein alphabetic characters are generated in an alphabetic character generation mode.

45. The keyboard system of claim 44 wherein generation of alphabetic characters in lower and upper cases is determined by stroking of a shift key.

46. The keyboard system of claim 1 having an external switch for activation of every key and a visual indicator associated with each key which periodically indicates that closing of the external switch will effect stroking of that key.

47. The keyboard system of claim 46 wherein each said visual indicator is comprised of a light emitting diode.

48. The keyboard system of claim 46 having a scanning strategy utilizing a dwell upon each visual indicator which follows a circulation path among a plurality of keys.

49. The keyboard system of claim 48 having more than one circulation path.

50. The keyboard system of claim 48 having two different circulation paths.

51. The keyboard system of claim 50 having one circulation path among a group of centrally located keys and one circulation path among a group of peripherally located keys.

52. The keyboard of claim 50 wherein closing of said external switch with said dwell upon a visual indicator common to both circulation paths effects alternation between the two circulation paths.

53. The keyboard system of claim 1 wherein said predetermined threshold time period between keystrokes is fixed.

54. The keyboard system of claim 1 wherein said predetermined threshold interval between keystrokes is variable.

55. The keyboard system of claim 54 wherein variation of said predetermined threshold interval is effected with a manual setting.

56. The keyboard system of claim 54 wherein variation of said predetermined threshold interval is effected with a particular sequence of keystrokes.

57. The keyboard system of claim 54 wherein variation of said predetermined threshold interval is made with selection from a plurality of discrete threshold interval values.

58. The keyboard system of claim 54 wherein variation of said predetermined threshold interval automatically adapts to a user's typing speed.

59. The keyboard system of claim 58 wherein automatic adaptation of the variation of said predetermined threshold interval is determined by an adaptive predictive algorithm.

60. The keyboard system of claim 59 wherein said adaptive predictive algorithm has two Least Mean Square (LMS) predictors of the interval between keystrokes determining the difference between link-space and character-space intervals.

61. The keyboard system of claim 60 wherein the following adaptive predictive algorithm is utilized:

an input signal of a unit-time-period LMS predictor is given as $$x_u(k) = f_u(n_S(k)) \quad \text{if} \quad n_S(k) < n_{Smax} \tag{1}$$

$$= f_u(n_{Smax}) \quad \text{if} \quad n_S(k) \geq n_{Smax}$$

where $n_{Smax}$ is the upper limit of $n_S(k)$; and a transfer function $f_u(\cdot)$ is defined by $$f_u(n_S(k)) = n_S(k) \quad \text{if} \quad S(k) = \text{a 'link space'} \tag{2}$$

$$= n_S(k)/\beta(k) \quad \text{if} \quad S(k) = \text{a 'character space'}$$

where $S/(k)$ is the output of a character-space decision rule at iteration k, $$\beta(k) = r(k) \quad \text{if} \quad r(k) < \beta_{max}$$

$$= \beta_{max} \quad \text{if} \quad r(k) \geq \beta_{max} \quad \text{wherein}$$

r(k) defined by equation (7) below is a predicted unstable inter-keystroke space ratio;

then, a predicted unit time period u(k) at iteration k is obtained from output of the predictor $$u(k) = x_u(k); \tag{3}$$

and for a time-length-difference LMS predictor, the input signal is given as $$x_d(k) = f_d(n_S(k)) \quad \text{if} \quad n_S(k) < n_{Smax} \tag{4}$$

$$= f_d(n_{Smax}) \quad \text{if} \quad n_S(k) \geq n_{Smax}$$

wherein the transfer function $f_d(\cdot)$ is defined by $$f_d(n_S(k)) = d(k) + u(k) - n_S(k) \quad \text{if} \quad S(k) = \text{a 'link space'} \tag{5}$$

$$= n_S(k) - u(k) \quad \text{if} \quad S(k) = \text{a 'character space'}$$

where d(k) denotes the predicted difference between link-space and character-space intervals at iteration k and is given by the output of the time-length-difference LMS predictor as $$d(k) = x_d(k); \tag{6}$$

and according to u(k) at equation (3) and d(k) at equation (6), the unstable inter-keystroke space ratio can be predicted by $$r(k) = (u(k) + d(k))/u(k) \tag{7}$$

and an adaptive threshold for inter-keystroke space time series at iteration k is expressed as $$h(k) = 2(r(k)u(k))/(1+r(k));  \quad (8)$$

whereby the character-space decision rule is accordingly summarized as $$S(k) = \text{a 'link space'} \quad \text{if} \quad n_S(k) \le h(k) \quad (9)$$

$$= \text{a 'character space'} \quad \text{if} \quad n_S(k) > h(k);$$

and h(k) is the adaptive threshold distinguishing between a 'link-space' and a 'character space'.

\* \* \* \* \*